US012587995B2

(12) United States Patent
Zorgui et al.

(10) Patent No.: US 12,587,995 B2
(45) Date of Patent: Mar. 24, 2026

(54) MAP-AIDED NODE SELECTION FOR POSITIONING AND RADIO FREQUENCY SENSING

(71) Applicant: QUALCOMM Incorporated, San Diego, CA (US)

(72) Inventors: Marwen Zorgui, San Diego, CA (US); Srinivas Yerramalli, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 18/169,778

(22) Filed: Feb. 15, 2023

(65) Prior Publication Data

US 2024/0276440 A1    Aug. 15, 2024

(51) Int. Cl.
| | |
|---|---|
| *H04W 64/00* | (2009.01) |
| *H04W 48/20* | (2009.01) |
| *H04W 72/25* | (2023.01) |

(52) U.S. Cl.
CPC ......... *H04W 64/003* (2013.01); *H04W 48/20* (2013.01); *H04W 72/25* (2023.01)

(58) Field of Classification Search
CPC . H04W 64/00; H04W 64/003; H04W 64/006; H04W 72/25; H04W 48/20; H04L 5/0035; H04L 5/0037; H04L 5/0048; G01S 5/0269; G01S 5/0009; G01S 5/0072; G01S 5/0205; G01S 7/006; G01S 13/765
USPC ........................................... 455/456
See application file for complete search history.

(56) References Cited

U.S. PATENT DOCUMENTS

| | | | | |
|---|---|---|---|---|
| 9,173,089 | B2 * | 10/2015 | Sridharan | H04W 8/26 |
| 10,849,020 | B2 * | 11/2020 | Henry | H04W 40/22 |
| 12,117,542 | B2 * | 10/2024 | Hassan | G01S 5/0081 |
| 2008/0154499 | A1 * | 6/2008 | Tanaka | G01C 21/3673 |
| | | | | 701/431 |
| 2008/0228654 | A1 * | 9/2008 | Edge | H04W 4/029 |
| | | | | 455/456.2 |
| 2013/0162471 | A1 * | 6/2013 | Suzuki | H04W 64/00 |
| | | | | 342/357.43 |

(Continued)

FOREIGN PATENT DOCUMENTS

WO        2022131988 A1    6/2022

OTHER PUBLICATIONS

Fischer S., "Chapter 15: 5G NR Positioning", In: 5G and Beyond: Fundamentals and Standards, Jan. 1, 2021, Springer International Publishing, Cham, XP055847961, pp. 429-483, sections 1, 3.2, 3.3.

(Continued)

*Primary Examiner* — Jean A Gelin
(74) *Attorney, Agent, or Firm* — QUALCOMM Incorporated

(57) ABSTRACT

In an aspect, a first network node may obtain first map information associated with at least one of a positioning session or an RF sensing session. The first network node may select, based on the map information, at least one of a first set of TRPs or at least one second network node for at least one of the positioning session or the RF sensing session. The first network node may configure at least one of the first set of TRPs or the at least one second network node for at least one of the positioning session or the RF sensing session.

29 Claims, 15 Drawing Sheets

(56) References Cited

U.S. PATENT DOCUMENTS

| | | | |
|---|---|---|---|
| 2015/0024775 A1* | 1/2015 | Jung .................. | H04W 64/006 |
| | | | 455/456.1 |
| 2016/0161440 A1* | 6/2016 | Sekimoto ............ | A61B 5/1486 |
| | | | 205/778 |
| 2017/0180938 A1* | 6/2017 | Smith .................... | H04W 4/08 |
| 2018/0255525 A1* | 9/2018 | Uchiyama ......... | H04W 56/0015 |
| 2018/0310129 A1* | 10/2018 | Xie ....................... | H04W 4/026 |
| 2019/0086212 A1* | 3/2019 | Koshy ................. | G01C 21/383 |
| 2022/0332416 A1* | 10/2022 | Kobayashi ........... | G05D 1/0274 |
| 2023/0053728 A1* | 2/2023 | Jin ..................... | G01C 21/3685 |
| 2023/0228588 A1* | 7/2023 | Lee .................... | G01C 21/3881 |
| | | | 701/455 |
| 2023/0228592 A1* | 7/2023 | Hong ................. | G01C 21/3822 |
| | | | 701/31.4 |
| 2023/0333242 A1* | 10/2023 | Tadayon ............. | H04L 27/0006 |
| 2023/0388867 A1* | 11/2023 | Umeda .................... | G08G 1/09 |
| 2024/0406923 A1 | 12/2024 | Shreevastav et al. | |

OTHER PUBLICATIONS

Guttman E (Samsung)., et al., "Pseudo-CR on Update of 5.5: Spatial Mapping and Localization Enabler Use Case", 3GPP Draft, 3GPP TSG SA WG 1 Meeting #101, S1-230262 (revision of S1-230zzz), Type PCR, FS_Metaverse, 3rd Generation Partnership Project, Mobile Competence Centre, 650, Route Des Lucioles, F-06921 Sophia-Antipolis Cedex, France, vol. 3GPP SA 1, No. Athens, GR, Feb. 20, 2023-Feb. 24, 2023, Feb. 10, 2023, XP052236986, 6 pages, the whole document.

Huawei, et al., "Considerations on NR Positioning", 3GPP TSG RAN WG1 Meeting #94, R1-1809348, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, 9 Pages, Aug. 11, 2018, XP051516712, the whole document.

International Search Report and Written Opinion—PCT/US2024/014431—ISA/EPO—May 31, 2024.

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

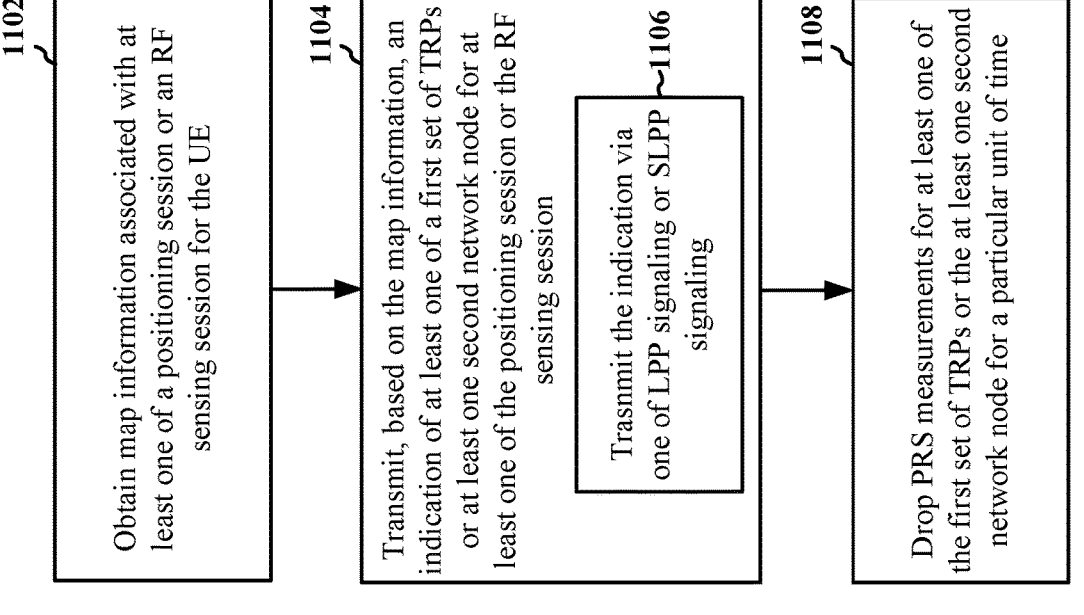

1102 — Obtain map information associated with at least one of a positioning session or an RF sensing session for the UE 1104 — Transmit, based on the map information, an indication of at least one of a first set of TRPs or at least one second network node for at least one of the positioning session or the RF sensing session 1106 — Trasnmit the indication via one of LPP signaling or SLPP signaling 1108 — Drop PRS measurements for at least one of the first set of TRPs or the at least one second network node for a particular unit of time

1100

FIG. 11

MAP-AIDED NODE SELECTION FOR POSITIONING AND RADIO FREQUENCY SENSING

TECHNICAL FIELD

The present disclosure relates generally to positioning systems, and more particularly, to positioning systems involving map information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long-Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first network node are provided. The apparatus may include memory and at least one processor coupled to the memory. The at least one processor, based at least in part on information stored in the memory may be configured to obtain first map information associated with at least one of a positioning session or a radio frequency (RF) sensing session, to select, based on the first map information, at least one of a first set of transmission-reception points (TRPs) or at least one second network node for at least one of the positioning session or the RF sensing session, and to configure at least one of the first set of TRPs or the at least one second network node for at least one of the positioning session or the RF sensing session.

In another aspect of the disclosure, a method, a computer-readable medium, and an apparatus at a first network node are provided. The apparatus may include memory and at least one processor coupled to the memory. The at least one processor, based at least in part on information stored in the memory may be configured to obtain map information associated with at least one of a positioning session or a radio frequency (RF) sensing session for the UE, and to transmit, based on the map information, an indication of at least one of a first set of TRPs or at least one network node for at least one of the positioning session or the RF sensing session.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a diagram illustrating an example of a hardware implementation for an example network entity.

DETAILED DESCRIPTION

Figure 1:
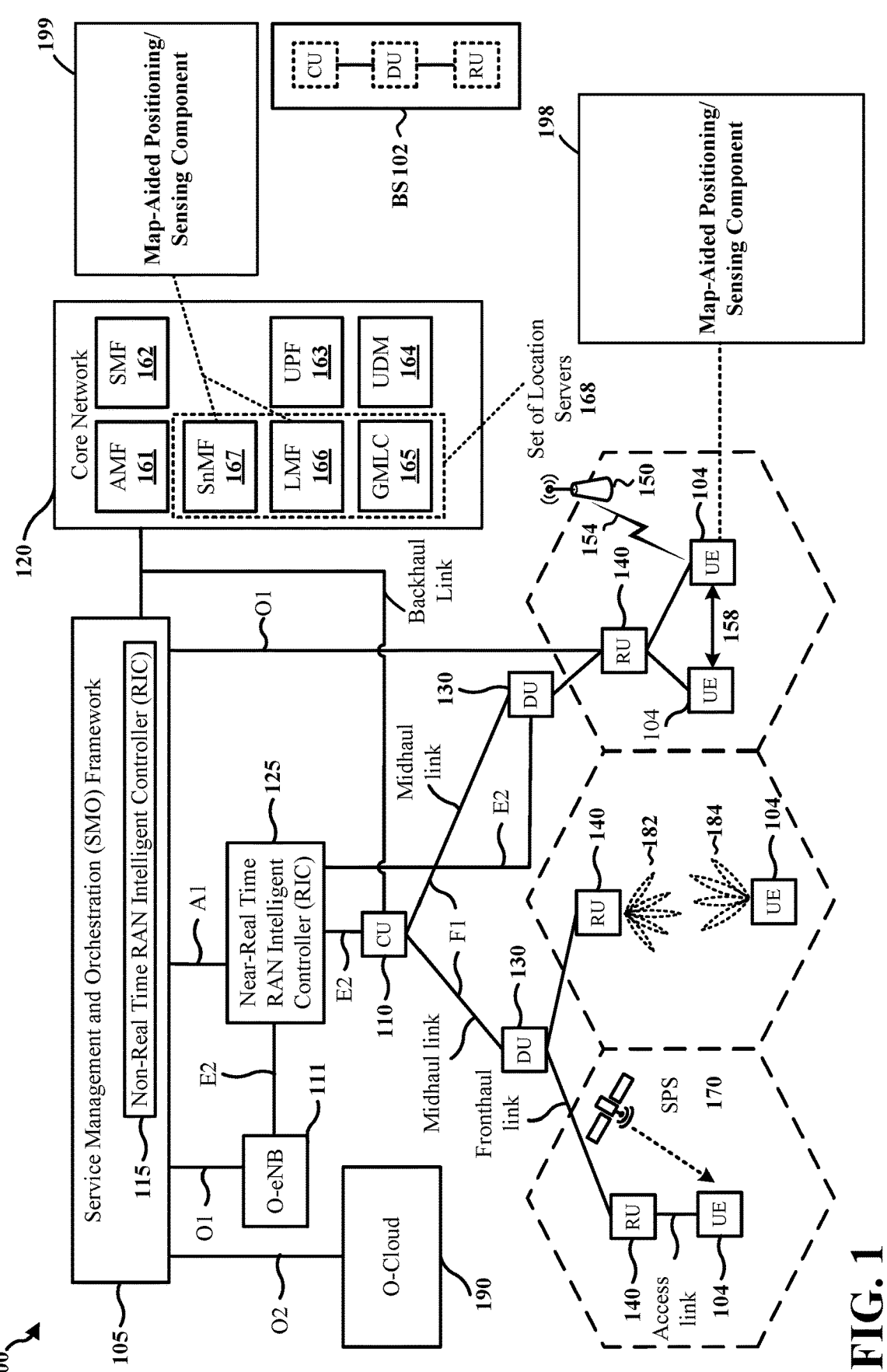
FIG. 1 is a diagram illustrating an example of a wireless communications system and an access network.

Various aspects relate generally to positioning systems. Some aspects more specifically relate to positioning or RF sensing utilizing map information. In some examples, a coordinator node may obtain map information regarding an environment in which a target entity for which a positioning or sensing session is to be performed. Based on at least the map information, the coordinator node may select and/or configure a set of transmission-reception points (TRPs) or anchor nodes to be utilized or not utilized for the positioning or sensing session. For example, the coordinator node may activate or deactivate the transmission or reception of reference signals (e.g., positioning reference signals (PRSs)) from the set of TRPs or anchor nodes based on the configuration. The coordinator node may select and/or configure the set of TRPs for uplink or downlink-based positioning or sensing and may select and/or configure the anchor nodes for sidelink-based positioning or sensing. In some aspects, the target UE may, based on its map information, provide an indication of a set of TRPs or anchor nodes to be utilized for its positioning or sensing session.

Particular aspects of the subject matter described in this disclosure can be implemented to realize one or more of the following potential advantages. By utilizing map information associated with the particular environment in which the target entity is located, the coordinator node may determine TRPs or anchor nodes that do not have a direct line of sight to the target entity due to obstacles in the environment that are indicated by the map information. The coordinator node may disable reference signal transmission or reception from such TRPs or anchor nodes. By disabling reference signal transmission or reception from such TRPs or anchor nodes, such TRPs or anchor nodes (as well as the target entity configured to detect such reference signals) may conserve compute resources (e.g., processing cycles, memory, power, etc.). The coordinator node may also enable reference signal transmission or reception from TRPs or anchor nodes that have a direct line of sight to the target entity. By enabling reference signal transmission or reception from such TRPs or anchor nodes, the position of the target entity may be more accurately determined.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods.

These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165, a Location Management Function (LMF) 166, and a Sensing Management Function (SnMF) 167. However, generally, the one or more location servers 168 may include one or more location/positioning servers, which may include one or more of the GMLC 165, the LMF 166, the SnMF 167, a position determination entity (PDE), a serving mobile location center (SMLC), a mobile positioning center (MPC), or the like. The GMLC 165, the LMF 166, and the SnMF 167 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The SnMF 167 coordinates RF sensing sessions for a target entity, for example, by configuring nodes (e.g., TRPs or UEs) for the RF sensing sessions. The SnMF 167 may also receive measurements and/or additional information from a node and determine a sensing result (e.g., a position of the target entity) based on the measurements and/or additional information. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a map-aided positioning/sensing component 198 that may be configured to obtain first map information associated with at least one of a positioning session or an RF sensing session, to select, based on the first map information, at least one of a first set of TRPs or at least one second network node for at least one of the positioning session or the RF sensing session, and to configure at least one of the first set of TRPs or the at least one second network node for at least one of the positioning session or the RF sensing session. In certain aspects, the map-aided positioning/sensing component 198 may be configured to obtain map information associated with at least one of a positioning session or an RF sensing session for the UE, and to transmit, based on the map information, an indication of at least one of a first set of TRPs or at least one network node for at least one of the positioning session or the RF sensing session. In certain aspects, the LMF 166 and/or SnMF 167 may have a map-aided positioning/sensing component 199 that may be configured to obtain first map information associated with at least one of a positioning session or an RF sensing session, to select, based on the first map information, at least one of a first set of TRPs or at least one second network node for at least one of the positioning session or the RF sensing session, and to configure at least one of the first set of TRPs or the at least one second network node for at least one of the positioning session or the RF sensing session.

Figures 2A, 2B, 2C, 2D:
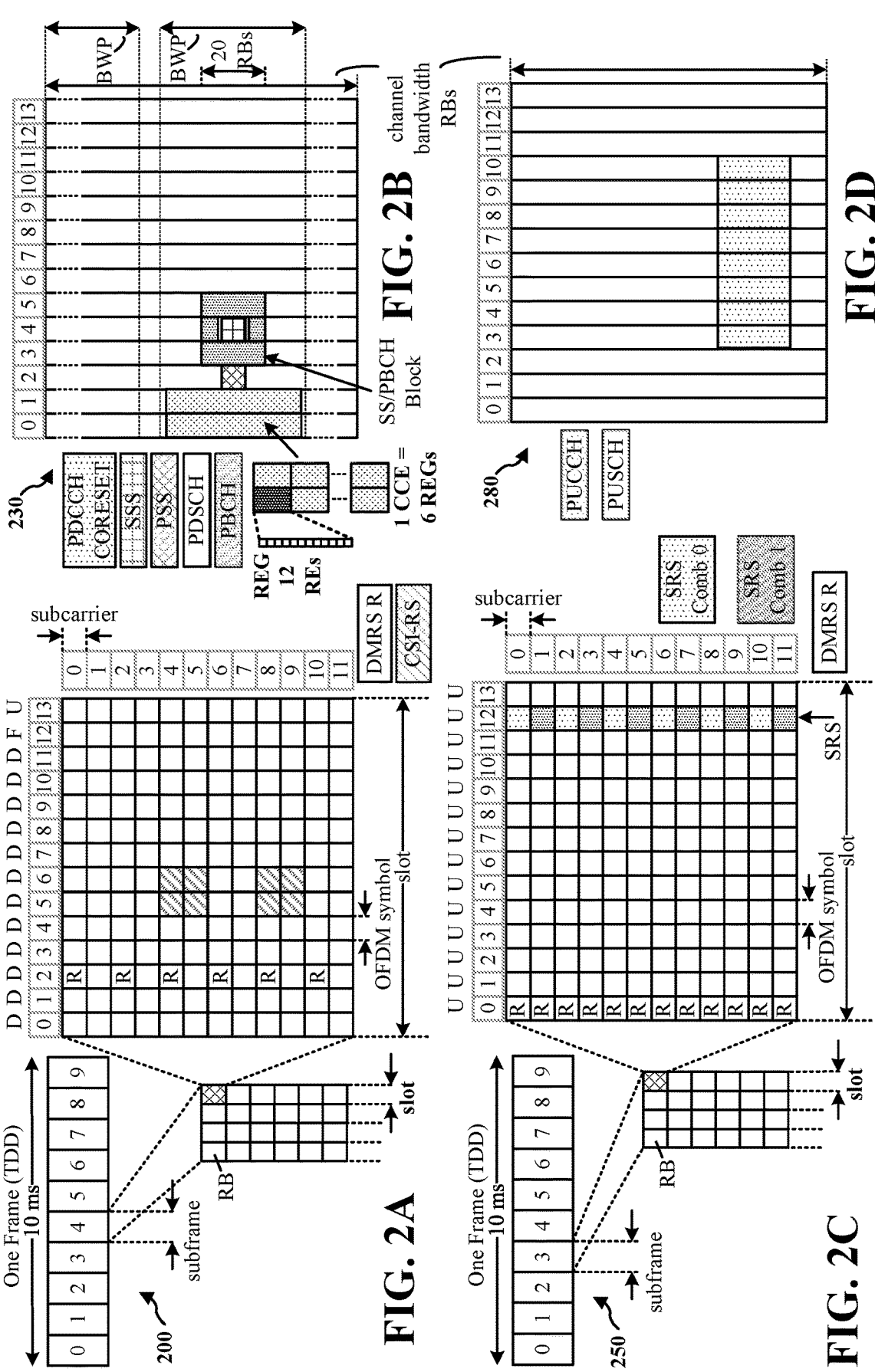
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu} * 15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
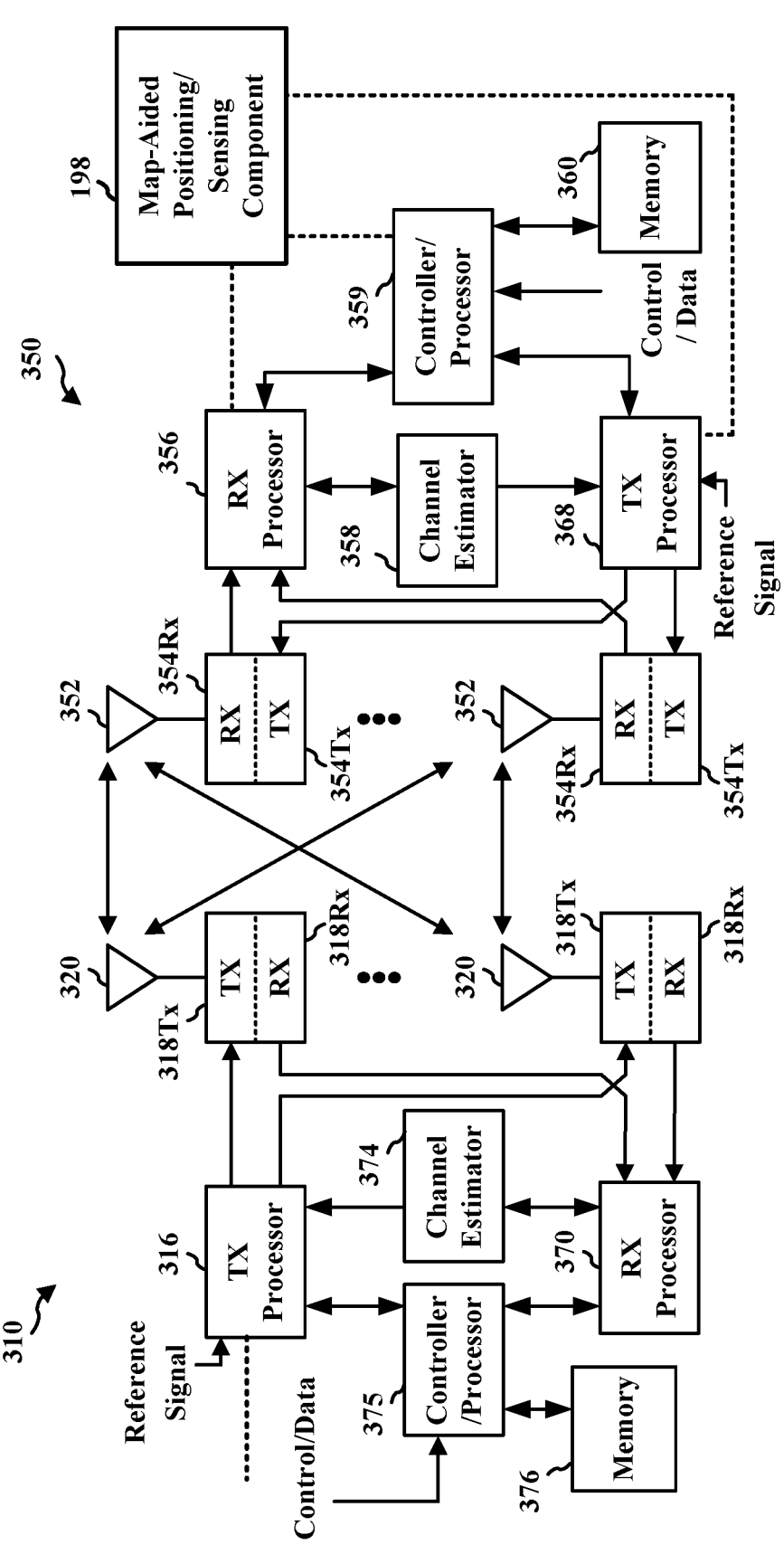
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the map-aided positioning/sensing component 198 of FIG. 1.

Figure 4:
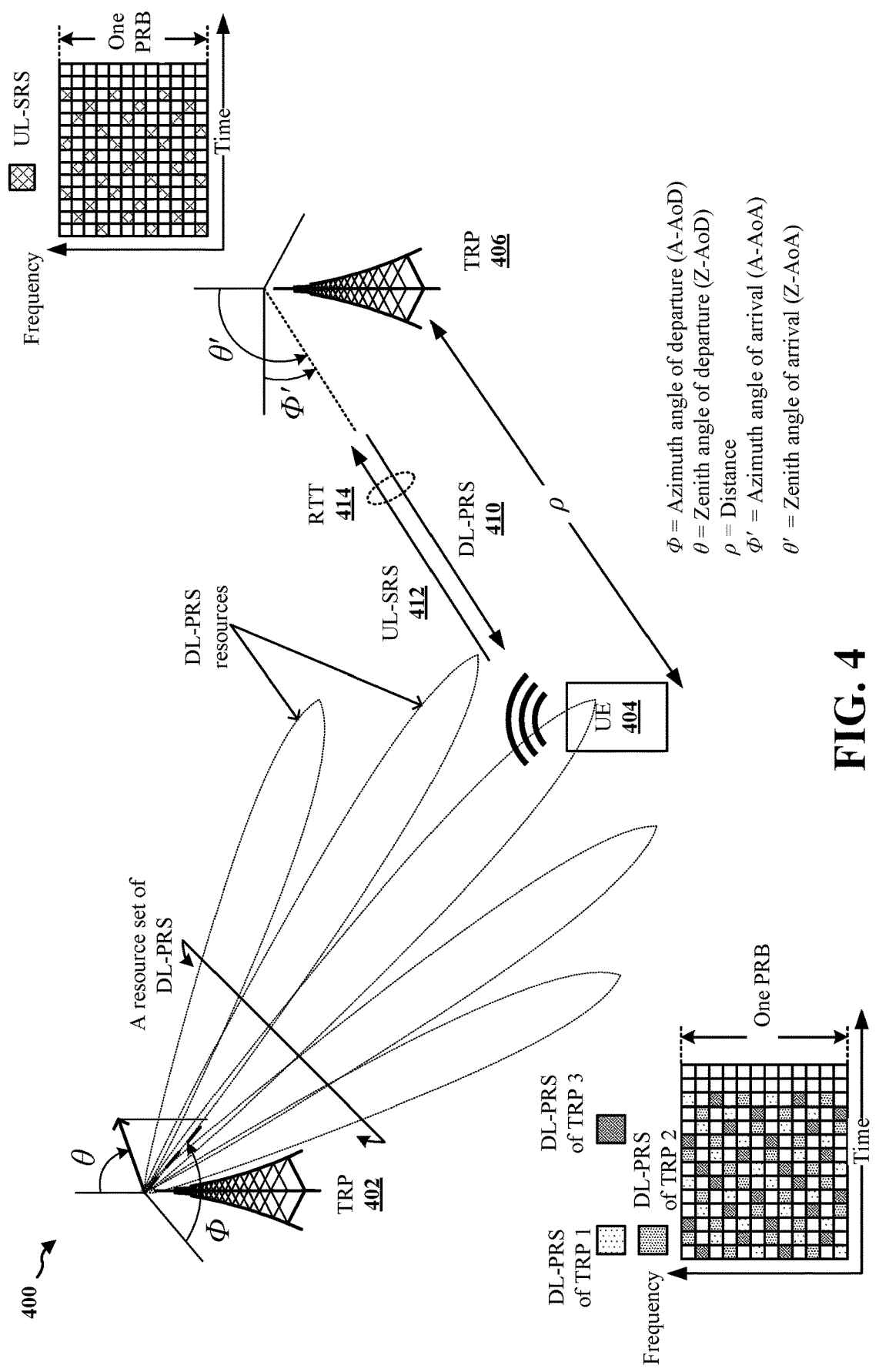
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-\|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a UE, an access point (AP), etc.) may also be configured to include sensing capabilities, where the wireless device may be able to sense (e.g., detect and/or track) one or more objects or target entities of an area or in an environment based on radio frequencies. An environment may refer to a particular geographical area or place, especially as affected by human activity, or the circumstances, objects, or conditions by which one is surrounded. For example, a wireless device may include a radar capability (which may be referred to as "RF sensing" and/or "cellular-based RF sensing), where the wireless device may transmit reference signals (e.g., radar reference signals (RRSs)) and measure the reference signals reflected from one or more objects (e.g., structures, walls, living objects, and/or things in an environment, etc.). Based on the measurement, the wireless device may determine or estimate a distance between the wireless device and the one or more objects and/or obtain environmental information associated with its surrounding. In another example, a first wireless device may receive signals transmitted from a second wireless device, where the first wireless device may determine or estimate a distance between the first wireless device and the second wireless device based on the received signals. For example, a tracking device (e.g., a Bluetooth tracker, an item tracker, an asset tracking device, etc.) may be configured to regularly transmit signals (e.g., beacon signals) or small amounts of data to a receiving device, such that the receiving device may be able to monitor the location or the relative distance of the tracking device. As such, a user may be able to track the location of an item (e.g., a car key, a wallet, a remote control, etc.) by attaching the tracking device to the item. For purposes of the present disclosure, a device/apparatus that is capable of performing sensing (e.g., transmitting and/or receiving signals for detecting at least one object or for estimating the distance between the device and the at least one object) may be referred to as a "sensing device" or a "sensing node." For example, a sensing device may be a UE, an AP device (e.g., a Wi-Fi router), a base station, a component of the base station, a TRP, a device capable of performing radar functions, etc. Furthermore, a target entity may be any object (e.g., a person, a vehicle, a UE, etc.) for which a positioning or sensing session is performed, for example, to determine a location thereof, a velocity thereof, a heading thereof, a physiological characteristic thereof, etc. In addition, a device/apparatus that is capable of transmitting signals to a sensing device for the sensing device to determine the location or the relative distance of the device/apparatus may be referred to as a "tracking device," a "tracker," or a "tag."

For purposes of the present disclosure, a positioning session may be referred to the transmitting, the receiving, and the measuring of reference signals for the purposes of determining a positioning result or state (e.g., a location, a heading, a velocity, etc.) of a target entity. An RF sensing session may be referred to the transmitting, the receiving, and the measuring of reference signals for the purposes of determining a sensing result or state of an environment in which the target entity is included (e.g., a change in the environment), at least one physiological characteristic of a target entity, a location of the target entity, a velocity of the target entity, a heading of the target entity, etc.

For positioning sessions, the fusion of map information and radio signal measurements may enhance the positioning performance. For example, map-aided positioning may be utilized for satellite selection. Based on the future (or predicted) three-dimensional (3D) environment of a vehicle and the known satellite locations, one or more satellites that will be visible during the predicted vehicle trajectory may be determined and selected. In another example, map-aided positioning may be utilized for adaptive sampling of inertial sensors, where sensors of a device may be turned on (e.g., activated) in areas where positioning is challenging (as indicated by the map) to improve the positioning accuracy and the sensors are turned off (e.g., deactivated) in areas which are less challenging for positioning. In a further example, map-aided positioning may be implemented using non-line-of-sight (NLOS) paths, where NLOS components are measured and projected on the map to provide additional equations for positioning. In yet a further example, map-aided positioning may be utilized for crowdsourcing for radar localization, where global reference maps may be generated based on radar inputs from different vehicles, which are then used to match to a new car radar signature input to generate the new car location.

Node selection (e.g., a TRP, a UE, etc.) in Uu (UE-terrestrial radio access network (TRAN)) positioning or sidelink-based positioning may play a role in improving the positioning or RF sensing performance. Different metrics may be utilized for node selection. Such metrics include, but are not limited to, signal-to-noise ratio (SNR), RSRP, etc. In some aspects, a TRP may be selected for NR UE-based positioning based on a geometric dilution of precision (GDOP) of different TRPs. For purposes of the present disclosure, a device/apparatus that is capable of selecting nodes for a positioning or sensing session (e.g., to coordinate a positioning or sensing session) is referred to as a coordinator node. As described herein, examples of a coordinator node include the LMF 166, the SnMF 167, or a UE (e.g., the UE 104, the UE 350, or the UE 404).

In some aspects, a TRP may be selected based on PRS measurements. For instance, a common set of TRPs may be selected for measurement by two UEs in a joint UE positioning session. In some aspects, node selection may be utilized for RFFP (random forest fingerprinting) federated learning, where the selection of UEs that participate in training of a federated learning positioning model is based on several criteria including, but not limited to, area, covered area, UE computational power, etc.

Within a positioning frequency layer, DL-PRS resources may be sorted in decreasing order of priority for measurements to be performed by the UE, with the reference being indicated by nr-DI-PRS-ReferenceInfo being the highest priority for measurement, and the following priority being assumed: up to 64 dl-PRS-IDs (downlink PRS identifiers that identify corresponding TRPs) of the frequency layer are sorted according to the priority; and up to 2 DL-PRS resource sets per dl-PRS-II) of the frequency layer are sorted according to the priority.

Using map information at the coordinator node (e.g., the LMF 166 for an uplink and/or downlink-based positioning session, the SnMF 167 for an uplink and/or downlink-based sensing session, or a coordinator UE for a sidelink-based positioning or sensing session), the coordinator node may select PRS resources (e.g., TRPs or anchor nodes (e.g., UEs)) to be measured by a target UE. For purposes of the present disclosure, a device/apparatus that is capable of participating in the transmission or reception of sidelink reference signals for a target UE is referred to as an anchor node. The set of dl-PRS-IDs provided to the target UE may be the result of using the map information. For example, having access to a map, and an approximate UE location, the coordinator node may estimate that some TRPs or anchor UEs will be blocked (or in a NLOS to the target UE), and then may exclude such TRPs or anchor UEs from the list of UE PRS measurements. The selection process may impact the order of priority of the dl-PRS-IDs that a target UE may measure. The coordinator node may update the list of PRS measurements that a target UE performs using the map information and its UE location estimate. For example, in a periodic positioning session, the coordinator node may estimate and track the target UE location. Based on the target UE location, the coordinator node may update the list of TRPs or anchor UEs that the target UE may measure. The list of PRS signals that may be updated based on the map information may include Uu PRS (e.g., for uplink or downlink-based positioning or sensing), sidelink PRS (e.g., for sidelink-based positioning or sensing), or a combination of Uu PRS or SL PRS (e.g., for joint Uu/sidelink-based positioning or sensing).

Figure 5:
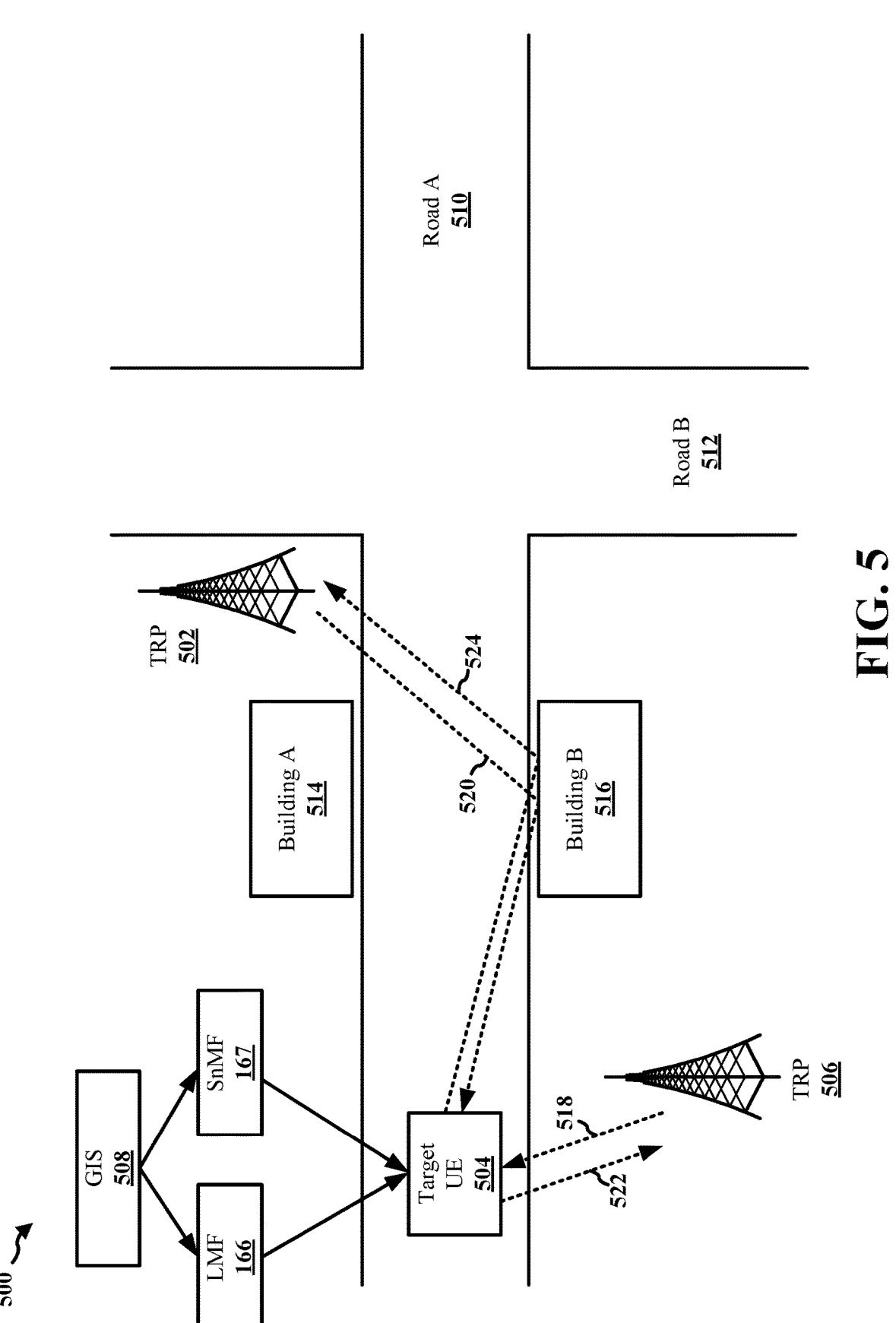
FIG. 5 is a diagram illustrating an environment in which an uplink or downlink positioning or RF sensing session is performed in accordance with various aspects of the present disclosure.

For example, FIG. 5 is a diagram 500 illustrating an environment in which a positioning or RF sensing session is performed in accordance with various aspects of the present disclosure. As shown in FIG. 5, the diagram 500 illustrates a first TRP 502, a second TRP 506, a target UE 504, a geographic information system (GIS)-based database 508, the LMF 166 and the SnMF 167. The LMF 166 may be utilized for performing a positioning session for the target UE 504, and the SnMF 167 may be utilized for performing a sensing session for the target UE 504. The LMF 166 and/or the SnMF 167 may obtain map information for the environment from the GIS-based database 508. For instance, the LMF 166 and/or the SnMF 167 may provide a request to the GIS-based database 508 for the map information, and the GIS-based database 508 may provide a response including the map information. The map information may include geographical data that represents various features located within the environment. The features may include both natural features and man-made features. Examples of natural features include, but are not limited to, trees, vegetation, canyons, mountains, etc. Examples of man-made features include, but are not limited to, roads, buildings, houses, bridges, poles, etc. In the example shown in FIG. 5, the geographical data provided to the LMF 166 and/or the SnMF 167 may represent the Road A 510, the Road B 512, the Building A 514, and the Building B 516.

The LMF 166 and/or the SnMF 167 may be configured to select one or more TRPs (e.g., TRPs 502 and 506) based on the map information obtained from the GIS-based database 508 and an approximate location of the target UE 504. In some aspects, the approximate location of the target UE 504 may correspond to a location previously-determined for the target UE 504, for example, via a previously-performed positioning or sensing session. In other aspects, the approximate location may be based on global navigation satellite system (GNSS)-based positioning coordinates (e.g., global positioning system (GPS) coordinates). In such aspects, the target UE 504 may provide its GNSS-based positioning coordinates to the LMF 166 and/or the SnMF 167.

In the example shown in FIG. 5, the LMF 166 and/or the SnMF 167 may select the TRP 506 for the positioning and/or sensing session and exclude the TRP 502 for the positioning and/or sensing session based on the map information and the approximate location of the target UE 504. The LMF 166 and/or the SnMF 167 may select the TRP 506, as it is in the line of sight of the target UE 504. That is, the reference signals 518 transmitted by the TRP 506 are provided directly to the target UE 504 without being reflected off any obstacles in the environment. Similarly, the reference signals 522 transmitted by the target UE 504 are received by the TRP 506 without being reflected off of any obstacles in the environment. The LMF 166 and/or the SnMF 167 may exclude the TRP 502, as is it not in the line of sight of the target UE 504. That is, the reference signals 520 transmitted by the TRP 502 are received by the target UE 504 as an NLOS, as the reference signals 520 reflect off of an obstacle (e.g., Building B 516) before being received by the target UE 504. Similarly, the reference signals 524 transmitted by the target UE 504 are received by the TRP 502 as an NLOS, as the reference signals 524 reflect off of an obstacle (e.g., Building B 616) before being received by the TRP 502.

The LMF 166 and/or the SnMF 167 may update the list of reference signal measurements to indicate that the TRP 506 was selected and provide the list to the target UE 504. The target UE 504 may utilize the list to perform measurements with respect to the reference signals received from the TRP 506 and not the reference signals received from the TRP 502. In the event that multiple TRPs are selected, the LMF 166 and/or the SnMF 167 may prioritize the multiple TRPs, for example, based on a distance of each of the TRPs with respect to the target UE 504, where closer the distance to the target UE 504, higher the priority of the TRP in the list.

In some aspects, map-based node selection may be performed without the LMF 166 and/or the SnMF 167. For instance, for sidelink-based positioning or sensing sessions, a coordinator UE may utilize map information to choose anchor nodes (e.g., anchor UEs) that will participate in the positioning or sensing session. The coordinator node may be the target UE itself, an anchor node, or a sidelink node (e.g., sidelink UE) whose role is coordinate the SL positioning or sensing session. The anchor node may be a node that participates in the transmission or reception of sidelink reference signals.

Figure 6:
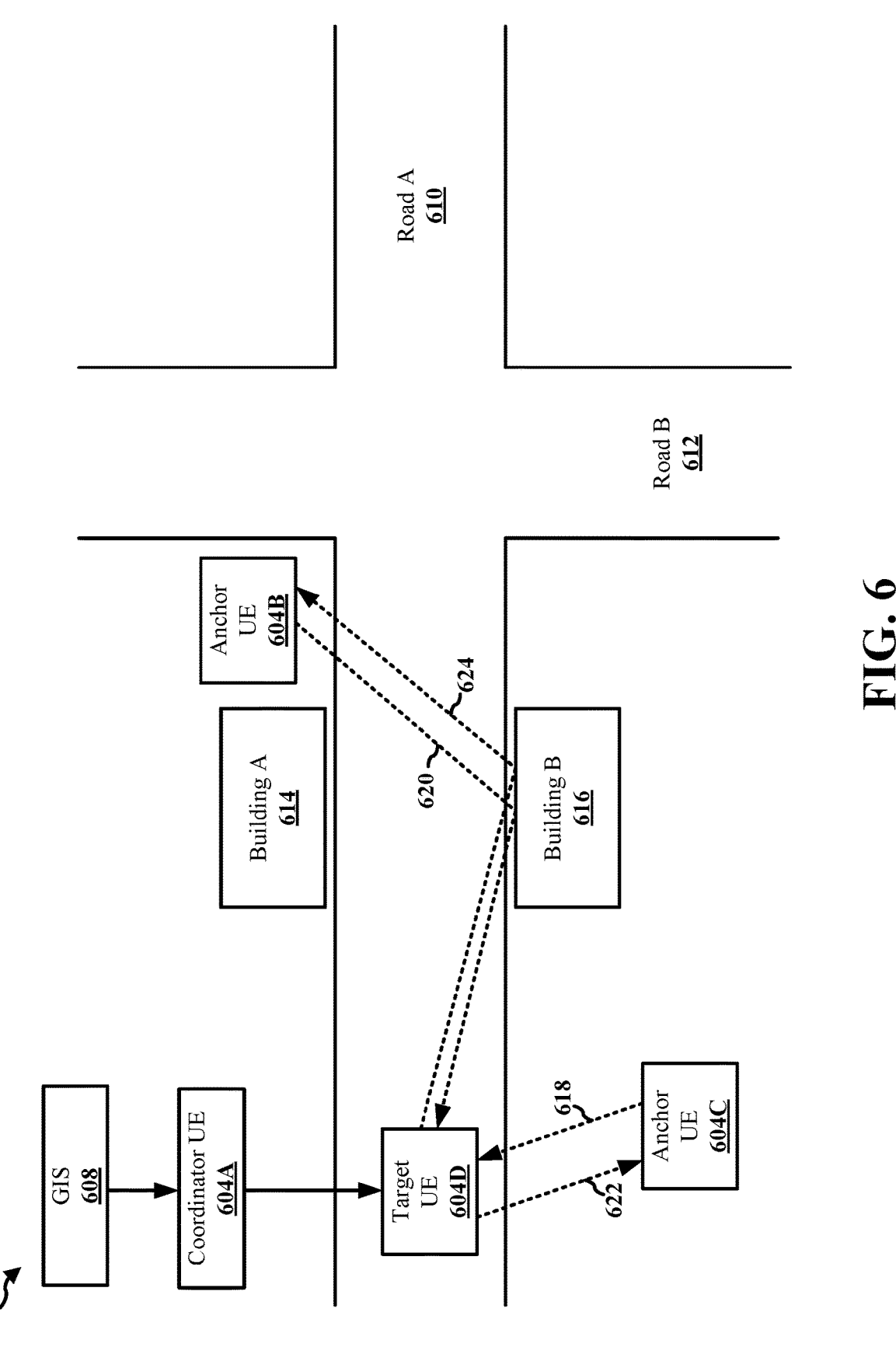
FIG. 6 is a diagram illustrating an environment in which a sidelink-based positioning or sidelink RF sensing session is performed in accordance with various aspects of the present disclosure.

For example, FIG. 6 is a diagram 600 illustrating an environment in which a sidelink-based positioning or sidelink RF sensing session is performed in accordance with various aspects of the present disclosure. As shown in FIG. 6, the diagram 600 illustrates a coordinator UE 604A, an anchor UE 604B, an anchor UE 604C, a target UE 604D, and a GIS-based database 608. The coordinator UE 604A may obtain map information for the environment from the GIS-based database 608. For instance, the coordinator UE 604A may provide a request to the GIS-based database 608 for the map information, and the GIS-based database 608 may provide a response including the map information. In the example shown in FIG. 6, the geographical data provided to the coordinator UE 604A may represent the Road A 610, the Road B 612, the Building A 614, and the Building B 616.

The coordinator UE 604A may be configured to select one or more anchor UEs based on the map information obtained from the GIS-based database 608 and an approximate location of the target UE 604D. In the example shown in FIG. 6, the coordinator UE 604A may select the anchor UE 604C for the positioning and/or sensing session and exclude the anchor UE 604B for the positioning and/or sensing session based on the map information and the approximate location of the target UE 604D. The coordinator UE 604A may select the anchor UE 604C, as it is in the line of sight of the target UE 604D. That is, the reference signals 618 transmitted by the anchor UE 604C are provided directly to the target UE 504 without being reflected off of any obstacles in the environment. Similarly, the reference signals 622 transmitted by the target UE 604D are received by the anchor UE 604C without being reflected off of any obstacles in the environment. The coordinator UE 604A may exclude the anchor UE 604B, as is it not in the line of sight of the target UE 504. That is, the reference signals 620 transmitted by the anchor UE 604B are received by the target UE 604D as an NLOS, as the reference signals 620 reflect off of an obstacle (e.g., Building B 616) before being received by the target UE 604D. Similarly, the reference signals 624 transmitted by the target UE 604D are received by the anchor node UE as an NLOS, as the reference signals 624 reflect off of an obstacle (e.g., Building B 616) before being received by the anchor UE 604B.

The coordinator UE 604A may update the list of reference signal measurements to indicate that the anchor UE 604C was selected and provide the list to the target UE 604D. The target UE 604D may utilize the list to perform measurements with respect to the reference signals received from the anchor UE 604C and not the reference signals received from the anchor UE 604B. In the event that multiple anchor nodes are selected, the coordinator UE 604A may prioritize the multiple anchor UEs, for example, based on a distance of each of the anchor UEs with respect to the target UE 604D, where closer the distance to the target UE 604, higher the priority of the anchor UE in the list.

In some aspects, a target UE may provide a list of suitable or desired TRPs/anchor UEs to the node coordinating the positioning or sensing session (e.g., the LMF 166, the SnMF 167, or the coordinator UE 604A) using its map information. The target UE may obtain its map information from a map application or web mapping platform executing on the target UE. Examples of map applications include, but are not limited, Google Maps™ published by Google, LLC of Mountain View, California, Apple Maps™ published by Apple Inc. of Cupertino, California, etc. The list may enable the coordinator node to update the priority of TRPs/SL UEs to be measured by the target UE, drop (e.g., ignore) certain PRS measurements for the target UE, or turn off (e.g., disable) certain PRS measurements from certain TRPs/anchor UEs.

In some aspects, a target UE may indicate (or suggest) to the LMF 166, the SnMF 167, or a sidelink UE (e.g., the coordinator UE 604A) that it is dropping (or may drop) Uu/SL PRS measurements for X units of time, where X may be expressed in a number of slots, a number of subframes, a number of milliseconds, a number of seconds, or a number of future resources. The PRS resources may be part of Uu-based positioning or sensing session, a sidelink-based positioning or sensing session, or a joint Uu/sidelink-based positioning or sensing session. When utilizing UE-based positioning (where the target UE determines the position of an entity (including itself) and does not share the results with another entity), the target UE may drop the measurements, and the indication from the target UE may help save and optimize over-the-air (OTA) resources. When utilizing UE-assisted positioning (where the target UE does not determine the position of an entity (including itself), but performs the measurements and shares the measurements with the LMF 166, SnMF 167, or the coordinator UE 604A), the target UE may recommend/suggest dropping certain resources. However, the network or the UE coordinating the session (e.g., for sidelink-based positioning or sensing) determines whether to activate the UE recommendation. The indication and/or recommendation described above may be communicated to the LMF 166 or the SnMF 167 through LTE positioning protocol (LPP) signaling or communicated to the coordinator UE 604A through sidelink-based positioning protocol (SLPP) signaling.

In some aspects, when utilizing UE-assisted positioning, the capability for the target UE, based on its map information, to drop measurements or change the priority of PRS measurements as provided by the LMF 166 or the SnMF 167 may be disabled or enabled by the LMF 166 or the SnMF 167. For instance, the LMF 166, the SnMF 167, or the coordinator UE 604A may provide an indication to the target UE 504 or 640D to disable or enable such a capability. The target UE 504 or the target UE 604D may have a default behavior if it includes a map-based processing capability. For example, by default, the target UE 504 or the target UE 604D may be enabled to adjust the priority of PRS measurements using its map information.

Figure 7A:
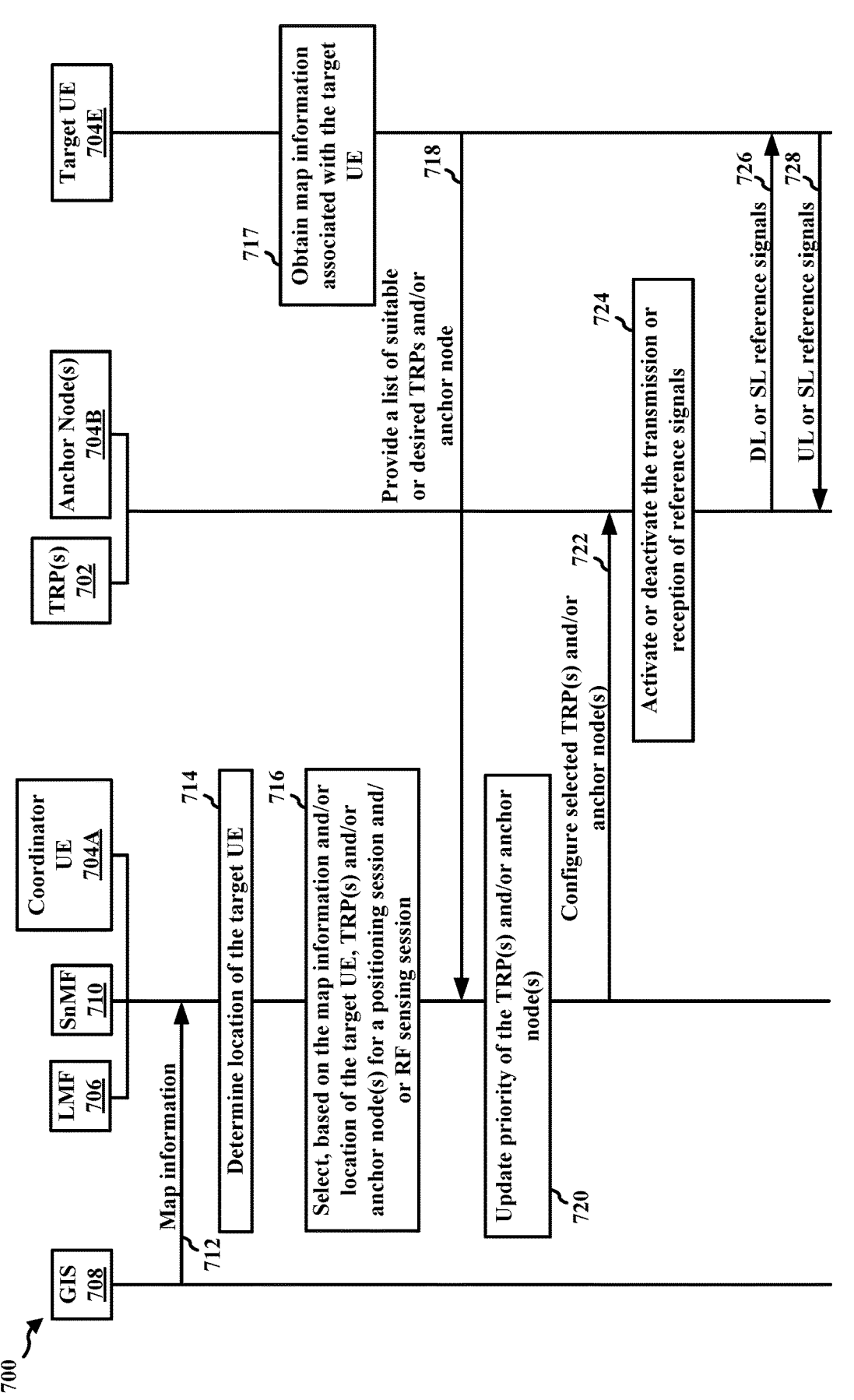
FIG. 7A depicts a call flow diagram illustrating a method of wireless communication in accordance with various aspects of this present disclosure.
Figure 7B:
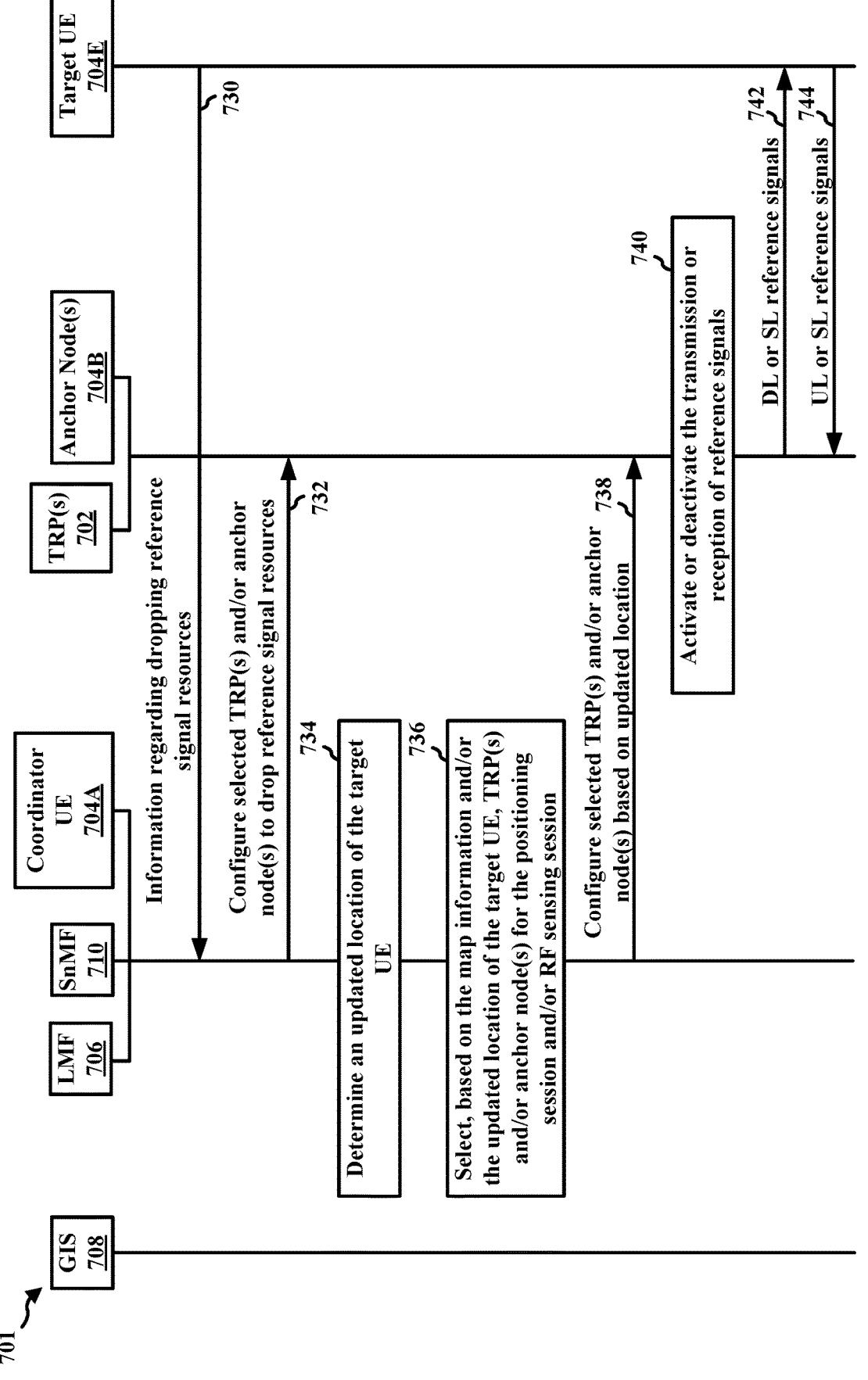
FIG. 7B depicts a call flow diagram illustrating a method of wireless communication in accordance with various aspects of this present disclosure.

FIG. 7A and FIG. 7B depict a call flow diagram 700 and a call flow diagram 701, respectively, illustrating a method of wireless communication in accordance with various aspects of this present disclosure. As shown in FIG. 7A, the diagram 700 includes one or more TRPs 702, one or more anchor node(s) 704B, a target UE 704E, an LMF 706, an SnMF 710, a coordinator UE 704A, and a GIS-based database 708. The LMF 706 and the TRP(s) 702 may be utilized for an uplink and/or downlink-based positioning session for the target UE 704E. The SnMF 710 and the TRP(s) 702 may be utilized for an uplink and/or downlink-based RF sensing session for the target UE 704E. The coordinator UE 704A and anchor node(s) 704B may be utilized for a sidelink-based positioning session or a sidelink-based RF sensing session. The GIS-based database 708 may be an example of the GIS-based database 608. The LMF 706 may be an example of the LMF 166. The SnMF 710 may be an example of the SnMF 167. The coordinator UE 704A may be an example of the UE 104, the UE 350, the UE 404, or the coordinator UE 604A. The TRP(s) 702 may be examples of the base station 102, the base station 310, the TRP 402, the TRP 406, the TRP 502, and the TRP 506. The anchor node(s) 704B may be an example of the UE 104, the UE 350, the UE 404, the anchor UE 604B, or the anchor UE 604C. The target UE 704E may be an example of the UE 104, the UE 350, the UE 404, the target UE 504, or the target UE 604D. Although aspects are described for the TRP(s) 702, the aspects may be performed by a network node in aggregation and/or by one or more components of the TRP(s) 702 (e.g., such as a CU 110, a DU 130, and/or an RU 140). As shown in FIG. 7A, at 712, the LMF 706, the SnMF, and/or the coordinator UE 704A may obtain map information from the GIS-based database 708. In some aspects, the coordinator UE 704A may obtain the map information from a map application or web mapping platform that executes on the coordinator UE 704A.

At 714, the LMF 706, the SnMF, and/or the coordinator UE 704A may determine the location of the target UE 704E. In some aspects, the location of the target UE 704E may correspond to a location previously-determined for the target UE 704E, for example, via a previously-performed positioning or sensing session. In other aspects, the location may be based on global navigation satellite system (GNSS)-based positioning coordinates (e.g., global positioning system (GPS) coordinates). In such aspects, the target UE 704E may provide its GNSS-based positioning coordinates to the LMF 166, the SnMF 167, and/or the coordinator UE 704A.

At 716, in aspects in which a downlink and/or uplink-based positioning session is to be performed for the target UE 704E, the LMF 706 may select, based on the map information and/or the location of the target UE 704E, one or more TRPs of the TRP(s) 702 for the positioning session. In aspects in which a downlink and/or uplink-based RF sensing session is to be performed for the target UE 704E, the SnMF 710 may select, based on the map information and/or the location of the target UE 704E, one or more TRPs of the TRP(s) 702 for the RF sensing session. In aspects in which a sidelink-based positioning session or a sidelink RF sensing session is to be performed for the target UE 704E, the coordinator UE 704A may select, based on the map information and/or the location of the target UE 704E, one or more anchor node(s) of the anchor node(s) 704B for the positioning session or the RF sensing session.

At 717, the target UE 704 may obtain map information associated with the target UE 704E. The target UE 704E may obtain its map information from a map application or web mapping platform executing on the target UE 704E. The map information may include geographical data that represents various features located within the environment in which the target UE 704E is located.

In some aspects, at 718, the LMF 166, the SnMF 167, and/or the coordinator UE 704A may receive, from the target UE 704E, information indicative of the TRP(s) and/or the anchor node(s) 704B. The information may be based on the map information associated with the target UE 704E obtained at 717. For example, at 718, in an aspect in which an uplink and/or downlink-based positioning or RF sensing session is being performed for the target UE 704E, the target UE 704 may provide a list of suitable or desired TRP(s) of the TRP(s) 702 to the LMF 706 and/or the SnMF 710. The list of suitable or desired TRP(s) of the TRP(s) 702 may be based on map information associated with the target UE 704E. The LMF 706 and/or the SnMF 710, at 720, may update, based on the received information at 718, a priority of the TRP(s) 702 for which reference signals (e.g., PRSs) are to be measured by the target UE 704E. In an aspect in which a sidelink-based positioning or RF sensing session is being performed for the target UE 704E, the target UE 704E may provide a list of suitable or desired anchor node(s) of the anchor node(s) 704B to the coordinator UE 704A. The coordinator UE 704A, at 720, may update, based on the received information at 718, a priority of the anchor node(s) 704B for which reference signals are to be measured by the target UE 704E.

In some aspects, each TRP of the TRP(s) 702 may be associated with an ID, which is associated with an ID for each reference signal (e.g., PRS) transmitted by the TRP.

At 722, in an aspect in which an uplink and/or downlink-based positioning or RF sensing session is being performed for the target UE 704E, the LMF 166 and/or the SnMF 167 may configure the TRP(s) of the TRP(s) 702 based on the selection at 716 and/or the list of suitable or desired TRP(s) received from the target UE 704E. For instance, the LMF 166 and/or the SnMF 167 may transmit an indication of the configuration to the TRP(s) of the TRP(s) 702 based on the selection at 716 and/or the list of suitable or desired TRP(s) received from the target UE 704E. In an aspect in which a sidelink-based positioning or RF sensing session is being performed for the target UE 704E, the coordinator UE 704A may configure the anchor node(s) of the anchor node(s) 704B based on the selection at 716 and/or the list of suitable or desired anchor node(s) received from the target UE 704E. For instance, the coordinator UE 704A may transmit an indication of the configuration to the anchor node(s) of the anchor node(s) 704B based on the selection at 716 and/or the list of suitable or desired anchor node(s) received from the target UE 704E.

In some aspects, in an aspect in which an uplink and/or downlink-based positioning or RF sensing session is being performed for the target UE 704E, the configuration may indicate that the selected TRP(s) of the TRP(s) 702 are to enable transmissions and/or receptions of reference signals (e.g., PRSs). Accordingly, at 724, the selected TRP(s) of the TRP(s) 702 may activate transmissions and/or receptions of reference signals. In some aspects, the LMF 166 and/or the SnMF 167 may configure the TRP(s) of the TRP(s) 702 that are not selected to disable transmission and/or reception of reference signals. Accordingly, at 724, the un-selected TRP(s) of the TRP(s) 702 may deactivate transmissions and/or receptions of reference signals. In an aspect in which sidelink-based positioning or RF sensing session is being performed for the target UE 704E, the configuration may indicate that the selected anchor node(s) of the anchor node(s) 704B are to enable transmissions and/or receptions of reference signals (e.g., PRSs). Accordingly, at 724, the selected anchor node(s) of the anchor node(s) 704B may activate transmissions and/or receptions of reference signals. In some aspects, the coordinator UE 704A may configure the anchor node(s) of the anchor node(s) 704B that are not selected to disable transmission and/or reception of reference signals. Accordingly, at 724, the un-selected anchor node(s) of the anchor node(s) 704B may deactivate transmissions and/or receptions of reference signals.

At 726, in an aspect in which an uplink and/or downlink-based positioning or RF sensing session is being performed for the target UE 704E, the selected TRP(s) of the TRP(s) 702 may transmit downlink reference signals to the target UE 704E as part of the uplink and/or downlink-based positioning or RF sensing session. In an aspect in which a sidelink-based positioning or RF sensing session is being performed for the target UE 704E, at 726, the selected anchor node(s) of the anchor node(s) 704B may transmit sidelink reference signals to the target UE 704E as part of the uplink and/or downlink-based positioning or RF sensing session.

At 728, in an aspect in which an uplink and/or downlink-based positioning or RF sensing session is being performed for the target UE 704E, the target UE 704E may transmit uplink reference signals to the selected TRP(s) of the TRP(s) 702 as part of the uplink-based positioning or RF sensing session. In an aspect in which a sidelink-based positioning or RF sensing session is being performed for the target UE 704E, the target UE 704E, at 728, may transmit sidelink reference signals to the selected anchor node(s) of the anchor node(s) 704B as part of the sidelink-based positioning or RF sensing session.

In some aspects, the downlink and uplink reference signals may include UE-TRAN PRSs. In some aspects, the sidelink reference signals may include sidelink (SL) PRSs.

In some aspects, at 730, the target UE 704E may provide an indication to the LMF 166, the SnMF 167 and/or the coordinator UE 704A that the target UE 704E is dropping reference signal measurements for reference signals received from the TRP(s) 702 at 726 (e.g., for an uplink and/or downlink-based positioning or RF sensing session) or reference signal measurements for reference signals received from the anchor node(s) 704B at 726 (e.g., for a sidelink-based positioning or RF sensing session). The indication may be based on the map information associated with the target UE 704E obtained at 717. The indication may indicate that the target UE 704E is dropping the measurements for a particular unit of time. In some aspects, the particular unit of time may include at least one of a number of slots, a number of subframes, a number of milliseconds, or a number of seconds.

In an aspect in which an uplink and/or downlink-based positioning session or RF sensing session is being performed for the target UE 704E, the target UE 704E, at 730, may provide an indication to the LMF 166 and/or the SnMF 167 that indicates (e.g., recommends or suggests) dropping reference signal resources for at least one of the TRP(s) 702. The LMF 166 and/or the SnMF 167 may, at 732, transmit an indication of a configuration, for the at least one of the TRP(s) 702, to drop the reference signal resources. The indication may be based on the map information associated with the target UE 704E obtained at 717. In an aspect in which a sidelink-based positioning session or RF sensing session is being performed for the target UE 704E, the target UE 704E, at 730, may provide an indication to the coordinator UE 704A that indicates (e.g., recommends or suggests) dropping reference signal resources for at least one of the anchor node(s) 704B. The coordinator UE 704A may, at 732, transmit an indication of a configuration, for the at least one of the anchor node(s) 704B, to drop the reference signal resources.

In some aspects, the indication (e.g., the recommendation or suggestion) may be transmitted to the LMF 166 and/or the SnMF 167 via LPP signaling. In some aspects, the indication (e.g., the recommendation or suggestion) may be transmitted to the coordinator UE 704A via SLPP signaling.

In an aspect in which an uplink and/or downlink-based positioning session or RF sensing session is being performed for the target UE 704E, the LMF 166 and/or the SnMF 167 may track the location of the target UE 704E and update the list of TRP(s) 702 for the target UE 704E to measure. For instance, at 734, the LMF 166 and/or the SnMF 167 may determine an updated location of the target UE 704E and, at 736, select another set of the TRP(s) 702 based on the updated location and the map information. The LMF 166 and/or the SnMF 167 may, at 738, configure the other set of the TRP(s) 702 for the positioning or RF sensing session based on the updated location. In an aspect in which sidelink-based positioning session or RF sensing session is being performed for the target UE 704E, the coordinator UE 704A may track the location of the target UE 704E and update the list of anchor node(s) 704B for the target UE 704E to measure. For instance, the coordinator UE 704A, at 734, may determine an updated location of the target UE 704E and, at 736, select another set of the anchor node(s) 704B based on the updated location and the map information. The coordinator UE 704A, at 738, may configure the other set of the anchor node(s) 704B for the positioning or RF sensing session.

In some aspects, in an aspect in which an uplink and/or downlink-based positioning or RF sensing session is being performed for the target UE 704E, the configuration may indicate that the selected TRP(s) of the TRP(s) 702 are to enable transmissions and/or receptions of reference signals (e.g., PRSs). Accordingly, at 740, the selected TRP(s) of the TRP(s) 702 may activate transmissions and/or receptions of reference signals. In some aspects, the LMF 166 and/or the SnMF 167 may configure the TRP(s) of the TRP(s) 702 that are not selected to disable transmission and/or reception of reference signals. Accordingly, at 740, the un-selected TRP(s) of the TRP(s) 702 may deactivate transmissions and/or receptions of reference signals. In an aspect in which sidelink-based positioning or RF sensing session is being performed for the target UE 704E, the configuration may indicate that the selected anchor node(s) of the anchor node(s) 704B are to enable transmissions and/or receptions of reference signals (e.g., PRSs). Accordingly, at 740, the selected anchor node(s) of the anchor node(s) 704B may activate transmissions and/or receptions of reference signals. In some aspects, the coordinator UE 704A may configure the anchor node(s) of the anchor node(s) 704B that are not selected to disable transmission and/or reception of reference signals. Accordingly, at 740, the un-selected anchor node(s) of the anchor node(s) 704B may deactivate transmissions and/or receptions of reference signals.

At 742, in an aspect in which an uplink and/or downlink-based positioning or RF sensing session is being performed for the target UE 704E, the newly-selected TRP(s) of the TRP(s) 702 may transmit downlink reference signals to the target UE 704E as part of the uplink and/or downlink-based positioning or RF sensing session. In an aspect in which a sidelink-based positioning or RF sensing session is being performed for the target UE 704E, at 742, the newly-selected anchor node(s) of the anchor node(s) 704B may transmit sidelink reference signals to the target UE 704E as part of the uplink and/or downlink-based positioning or RF sensing session.

At 744, in an aspect in which an uplink and/or downlink-based positioning or RF sensing session is being performed for the target UE 704E, the target UE 704E may transmit uplink reference signals to the newly-selected TRP(s) of the TRP(s) 702 as part of the uplink-based positioning or RF sensing session. In an aspect in which a sidelink-based positioning or RF sensing session is being performed for the target UE 704E, at 744, the target UE 704E may transmit sidelink reference signals to the newly-selected anchor node(s) of the anchor node(s) 704B as part of the sidelink-based positioning or RF sensing session.

Figure 8:
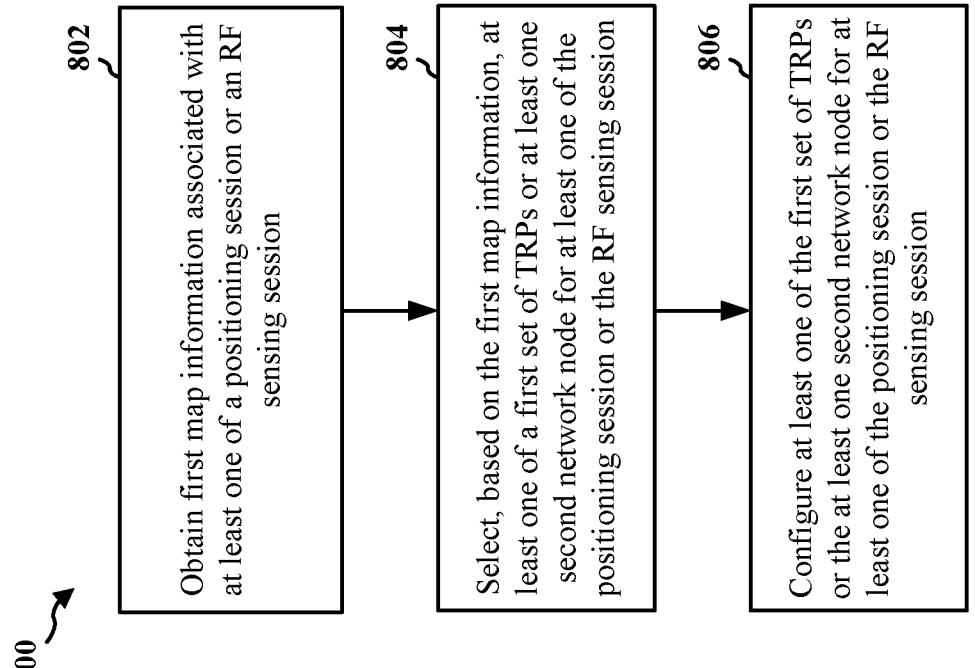
FIG. 8 is a flowchart illustrating a method of wireless communication at a wireless entity in accordance with various aspects of this present disclosure.

FIG. 8 is a flowchart 800 illustrating methods of wireless communication at a first network node in accordance with various aspects of the present disclosure. In some aspects, the first network node may be the LMF 166, the LMF 706, the SnMF 167, the SnMF 710, the UE 104, the UE 350, the UE 404, the coordinator UE 604A, or the coordinator UE 704A, the apparatus 1204 in the hardware implementation of FIG. 12, or the network entity 1460 in the hardware implementation of FIG. 12.

At 802, the first network node may obtain first map information associated with at least one of a positioning session or an RF sensing session. For example, referring to FIG. 7A, the LMF 706, the SnMF, and/or the coordinator UE 704A, at 712, may obtain first map information associated with at least one of a positioning session or an RF sensing session from the GIS-based database 708. In an aspect in which an uplink and/or downlink-based positioning or RF sensing session is being performed, 802 may be performed by the map-aided positioning/sensing component 199. In an aspect in which sidelink-based positioning or RF sensing session is being performed, 802 may be performed by the map-aided positioning/sensing component 198.

In some aspects, the first network node may be a first UE that is configured to coordinate at least one of the positioning session or the RF sensing session for the at least one second network node, and the at least one second network node may be a second UE. For example, referring to FIG. 7A, the first network node may be the coordinator UE 704A, which may be configured to coordinate at least one of the positioning session or the RF sensing session for the at least one anchor node of the anchor node(s) 704B. As described above, the at least one anchor node of the anchor node(s) 704B may be a UE.

At 804, the first network node may select, based on the first map information, at least one of a first set of TRPs or at least one second network node for at least one of the positioning session or the RF sensing session. For example, referring to FIG. 7A, in an aspect in which an uplink and/or downlink-based positioning or RF sensing session is being performed, the LMF 706 or the SnMF 710, at 716, may select, based on the first map information, at least one of a first set of the TRP(s) 702 for at least one of the positioning session or the RF sensing session. In an aspect in which a sidelink-based positioning or RF sensing session is being performed, the coordinator UE 704A, at 716, may select, based on the first map information, at least one of a first set of the anchor node(s) 704B for at least one of the positioning session or the RF sensing session. In an aspect in which an uplink and/or downlink-based positioning or RF sensing session is being performed, 804 may be performed by the map-aided positioning/sensing component 199. In an aspect in which sidelink-based positioning or RF sensing session is being performed, 804 may be performed by the map-aided positioning/sensing component 198.

In some aspects, the first network node may determine a first location of a target UE for which at least one of the positioning session or the RF sensing session is performed. The first network node may select at least one of the first set of TRPs or the at least one second network node by selecting at least one of the first set of TRPs or the at least one second network node based on the first location and the map information. For example, referring to FIG. 7A, in an aspect in which an uplink and/or downlink-based positioning or RF sensing session is being performed, the LMF 706 or the SnMF 710 may, at 714, determine a first location of the target UE 704E. The LMF 706 or the SnMF 710 may, at 716, select at least one of the TRP(s) 702 based on the first location and the map information. In an aspect in which sidelink-based positioning or RF sensing session is being performed, the coordinator UE 704A may, at 714, determine a first location of the target UE 704E. The coordinator UE 704A may, at 716, select at least one of the anchor node(s) 704B based on the first location and the map information.

In some aspects, the first network node may receive information indicative of at least one of the first set of TRPs or the at least one second network node, where the information is based on second map information associated with the target UE, and where the at least one of the positioning session or the RF sensing session is performed for the target UE. For example, referring to FIG. 7A, in an aspect in which an uplink and/or downlink-based positioning or RF sensing session is being performed, the LMF 706 or the SnMF 710 may receive, at 718, information indicative of at least one of the first set of TRP(s) 702. The information may be based on map information associated with the target UE 704E and obtained at 717. The information may include a list of suitable or desired TRPs of TRP(s) 702. In an aspect in which a sidelink-based positioning or RF sensing session is being performed, the coordinator UE 704A may receive, at 718, information indicative of at least one of the first set of anchor node(s) 704B. The information may be based on map information associated with the target UE 704E and obtained at 717. The information may include a list of suitable or desired anchor node(s) of anchor node(s) 704B.

In some aspects, the first network node may update, based on the information, a priority of at least one of the first set of TRPs or the at least one second network node for which PRSs are to be measured by the target UE. For example, referring to FIG. 7A, in an aspect in which an uplink and/or downlink-based positioning or RF sensing session is being performed, the LMF 706 or the SnMF 710, at 720, may update, based on the information, a priority of the first set of TRP(s) 702 for which PRSs are to be measured by the target UE 704E. In an aspect in which sidelink-based positioning or RF sensing session is being performed, the coordinator UE 704A, at 720, may update, based on the information, a priority of the first set of anchor node(s) 704B for which PRSs are to be measured by the target UE 704E.

At 806, the first network node may configure at least one of the first set of TRPs or the at least one second network node for at least one of the positioning session or the RF sensing session. For example, referring to FIG. 7A, in an aspect in which an uplink and/or downlink-based positioning or RF sensing session is being performed, the LMF 706 or the SnMF 710, at 722, may configure at least one of the first set of the TRP(s) 702 for at least one of the positioning session or the RF sensing session. In an aspect in which a sidelink-based positioning or RF sensing session is being performed, the coordinator UE 704A, at 722, may configure at least one of the first set of the anchor node(s) 704B for at least one of the positioning session or the RF sensing session. In an aspect in which an uplink and/or downlink-based positioning or RF sensing session is being performed, 806 may be performed by the map-aided positioning/sensing component 199. In an aspect in which sidelink-based positioning or RF sensing session is being performed, 806 may be performed by the map-aided positioning/sensing component 198.

In some aspects, an ID for each TRP in the first set of TRPs is associated with an ID for each PRS in a first set of PRSs. For example, referring to FIG. 7A, an ID for each TRP of the TRP(s) 702 is associated with an ID for each PRS in a first set of PRSs (e.g., transmitted by each TRP of the TRP(s) 702 at 726).

In some aspects, the PRS may include at least one of a UE-TRAN PRS or a sidelink PRS. For example, referring to FIG. 7A, in an aspect in which an uplink and/or downlink-based positioning or RF sensing session is being performed, the PRSs transmitted by the TRP(s) 702 at 726 may include UE-TRAN PRS. In an aspect in which a sidelink-based positioning or RF sensing session is being performed, the PRSs transmitted by the anchor node(s) 704B may be sidelink PRSs.

In some aspects, the first network node may configure at least one of the first set of TRPs or the at least one second network node for at least one of the positioning session or the RF sensing session by transmitting, to at least one of the first set of TRPs or the at least one second network node, an indication of the configuration of at least one of the first set of TRPs or the at least one second network node for at least one of the positioning session or the RF sensing session. For example, referring to FIG. 7A, in an aspect in which an uplink and/or downlink-based positioning or RF sensing session is being performed, the LMF 706 or the SnMF 710, at 722, may transmit an indication of the configuration to the first set of the TRP(s) 702 for at least one of the positioning session or the RF sensing session. In an aspect in which a sidelink-based positioning or RF sensing session is being performed, the coordinator UE 704A, at 722, may transmit an indication of the configuration to the anchor node(s) 704B for at least one of the positioning session or the RF sensing session.

In some aspects, the first network node may transmit, for at least one of the first set of TRPs or the at least one second network node based on the information, an indication that indicates PRS transmissions are to be disabled. For example, referring to FIG. 7A, in an aspect in which an uplink and/or downlink-based positioning or RF sensing session is being performed, the LMF 706 or the SnMF 710, at 722, may transmit, for at least one of the first set of TRP(s) 702 based on the information, an indication that indicates PRS transmissions are to be disabled. The indication may be transmitted as part of the indication of the configuration transmitted at 722. In an aspect in which a sidelink-based positioning or RF sensing session is being performed, the coordinator UE 704A, at 722, may transmit, for the anchor node(s) 704B based on the information, an indication that indicates PRS transmissions are to be disabled. The indication may be transmitted as part of the indication of the configuration transmitted at 722.

In some aspects, the first network node may receive an indication that a target UE, for which at least one of the positioning session or the RF sensing session is performed, is dropping PRS measurements for a particular unit of time. The indication may be based on map information associated with the target UE. For example, referring to FIG. 7B, in an aspect in which an uplink and/or downlink-based positioning or RF sensing session is being performed, the LMF 706 or the SnMF 710, at 730, may receive an indication that the target UE 704E is dropping PRS measurements for a particular unit of time. The indication may be based on map information associated with the target UE 704E. In an aspect in which a sidelink-based positioning or RF sensing session is being performed, the coordinator UE 704A may receive an indication that the target UE 704E is dropping PRS measurements for a particular unit of time.

In some aspects, the particular unit of time may include at least one of a number of slots, a number of subframes, a number of milliseconds, or a number of seconds. For example, referring to FIG. 7B, the particular unit of time that may be indicated via the indication received at 730 may include at least one of a number of slots, a number of subframes, a number of milliseconds, or a number of seconds.

In some aspects, the first network node may receive, from a target UE, an indication that indicates (e.g., recommends or suggests) dropping PRS resources for at least one of one or more TRPs of the first set of TRPs or the at least one second network node. The first network node may transmit, for at least one of the one or more TRPs of the first set of TRPs or the at least one second network node, an indication to drop the PRS resources. For example, referring to FIG. 7B, in an aspect in which an uplink and/or downlink-based positioning or RF sensing session is being performed, the LMF 706 or the SnMF 710, at 730, may receive, from the target UE 704E, an indication that indicates (e.g., recommends or suggests) dropping PRS resources for at least one of the TRP(s) 702. The LMF 706 or the SnMF 710 may, at 732, transmit, for the at least one of the TRP(s) 702, an indication to drop the PRS resources. In an aspect in which a sidelink-based positioning or RF sensing session is being performed, the coordinator UE 704A, at 730, may receive, from the target UE 704E, an indication that indicates (e.g., recommends or suggests) dropping PRS resources for at least one of the anchor node(s) 704B. The coordinator UE 704A may, at 732, transmit, for the at least one of the anchor node(s) 704B, an indication to drop the PRS resources.

In some aspects, the first network node may receive the indication via one of LPP signaling or SLPP signaling. For example, referring to FIG. 7B, in an aspect in which an uplink and/or downlink-based positioning or RF sensing session is being performed, the LMF 706 or the SnMF 710 may, at 730, receive the indication via LPP signaling. In an aspect in which a sidelink-based positioning or RF sensing session is being performed, the coordinator UE 704A may, at 730, receive the indication via SLPP signaling.

In some aspects, the first network node may determine a second location of the target UE. The first network node may select, based on the second location and the map information, at least one of a second set of TRPs or the at least one third network node for at least one of the positioning session or the RF sensing session. The first network node may configure at least one of the second set of TRPs or the at least one third network node for at least one of the positioning session or the RF sensing session. For example, referring to FIG. 7B, in an aspect in which an uplink and/or downlink-based positioning or RF sensing session is being performed, the LMF 706 or the SnMF 710 may, at 734, determine an updated location of the target UE 704E. The LMF 706 or the SnMF 710, at 736, may select, based on the updated location and the map information, a second set of the TRP(s) 702. The LMF 706 or the SnMF 710, at 738, may configure one or more other TRP(s) of the TRP(s) 702. In an aspect in which sidelink-based positioning or RF sensing session is being performed, the coordinator UE 704A, at 734, may determine an updated location of the target UE 704E. The coordinator UE 704A, at 736, may select, based on the second location and the map information, at least another anchor node from anchor node(s) 704B. The coordinator UE 704A, at 738, may configure the at least other anchor node of the anchor node(s) 704B.

Figure 9:
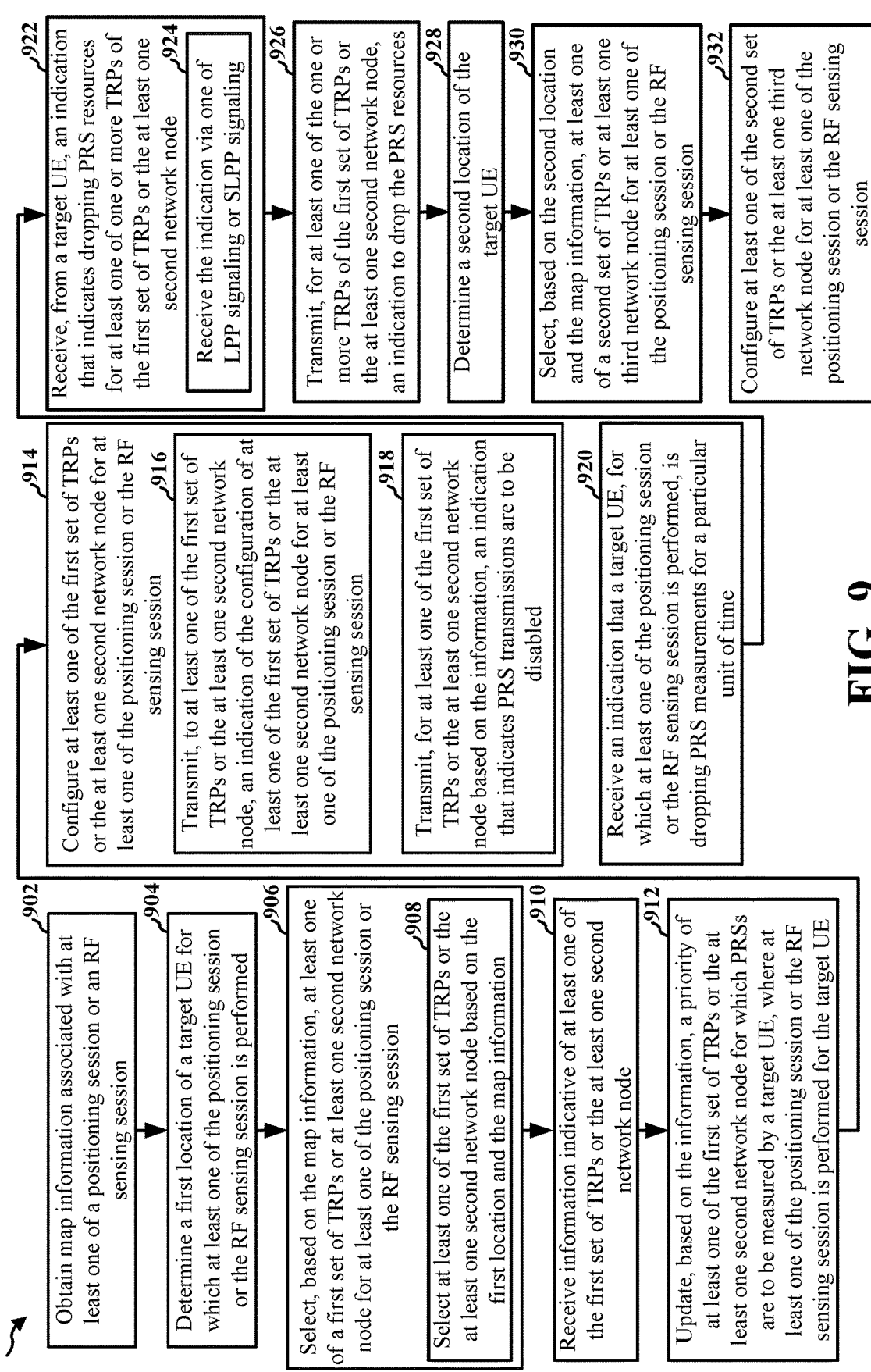
FIG. 9 is a flowchart illustrating a method of wireless communication at a network entity in accordance with various aspects of this present disclosure.

FIG. 9 is a flowchart 900 illustrating methods of wireless communication at a first network node in accordance with various aspects of the present disclosure. In some aspects, the first network node may be the LMF 166, the LMF 706, the SnMF 167, the SnMF 710, the UE 104, the UE 350, the UE 404, the coordinator UE 604A, or the coordinator UE 704A, the apparatus 1204 in the hardware implementation of FIG. 12, or the network entity 1460 in the hardware implementation of FIG. 12.

At 902, the first network node may obtain first map information associated with at least one of a positioning session or an RF sensing session. For example, referring to FIG. 7A, the LMF 706, the SnMF, and/or the coordinator UE 704A, at 712, may obtain map information associated with at least one of a positioning session or an RF sensing session from the GIS-based database 708. In an aspect, 902 may be performed by the map-aided positioning/sensing component 198 or the map-aided positioning/sensing component 199.

In some aspects, the first network node may be a first UE that is configured to coordinate at least one of the positioning session or the RF sensing session for the at least one second network node, and the at least one second network node may be a second UE. For example, referring to FIG. 7A, the first network node may be the coordinator UE 704A, which may be configured to coordinate at least one of the positioning session or the RF sensing session for the at least one anchor node of the anchor node(s) 704B. As described above, the at least one anchor node of the anchor node(s) 704B may be a UE.

At 904, the first network node may determine a first location of a target UE for which at least one of the positioning session or the RF sensing session is performed. For example, referring to FIG. 7A, in an aspect in which an uplink and/or downlink-based positioning or RF sensing session is being performed, the LMF 706 or the SnMF 710 may, at 714, determine a first location of the target UE 704E. In an aspect in which sidelink-based positioning or RF sensing session is being performed, the coordinator UE 704A may, at 714, determine a first location of the target UE 704E. In an aspect, 904 may be performed by the map-aided positioning/sensing component 198 or the map-aided positioning/sensing component 199.

At 906, the first network node may select, based on the first map information, at least one of a first set of TRPs or at least one second network node for at least one of the positioning session or the RF sensing session. For example, referring to FIG. 7A, in an aspect in which an uplink and/or downlink-based positioning or RF sensing session is being performed, the LMF 706 or the SnMF 710, at 716, may select, based on the map information, at least one of a first set of the TRP(s) 702 for at least one of the positioning session or the RF sensing session. In an aspect in which a sidelink-based positioning or RF sensing session is being performed, the coordinator UE 704A, at 716, may select, based on the map information, at least one of a first set of the anchor node(s) 704B for at least one of the positioning session or the RF sensing session. In an aspect, 906 may be performed by the map-aided positioning/sensing component 198 or the map-aided positioning/sensing component 199.

In some aspects, as part of 906, at 908, the first network node may select at least one of the first set of TRPs or the at least one second network node based on the first location and the map information. For example, referring to FIG. 7A, in an aspect in which an uplink and/or downlink-based positioning or RF sensing session is being performed, the LMF 706 or the SnMF 710 may, at 716, select at least one of the TRP(s) 702 based on the first location and the map information. In an aspect in which sidelink-based positioning or RF sensing session is being performed, the coordinator UE 704A may, at 716, select at least one of the anchor node(s) 704B based on the first location and the map information. In an aspect, 908 may be performed by the map-aided positioning/sensing component 198 or the map-aided positioning/sensing component 199.

At 910, the first network node may receive, from a target UE, information indicative of at least one of the first set of TRPs or the at least one second network node, where the information is based on second map information associated with the target UE, and where the at least one of the positioning session or the RF sensing session is performed for the target UE. For example, referring to FIG. 7A, in an aspect in which an uplink and/or downlink-based positioning or RF sensing session is being performed, the LMF 706 or the SnMF 710 may receive from the target UE 704E, at 718, information indicative of the first set of TRP(s) 702, where the information is based on second map information associated with the target UE 704E and received at 717. The information may include a list of suitable or desired TRPs of TRP(s) 702. In an aspect in which a sidelink-based positioning or RF sensing session is being performed, the coordinator UE 704A may receive from the target UE 704E, at 718, information indicative of the first set of anchor node(s) 704B, where the information is based on second map information associated with the target UE 704E and received at 717. The information may include a list of suitable or desired anchor node(s) of anchor node(s) 704B. In an aspect, 910 may be performed by the map-aided positioning/sensing component 198 or the map-aided positioning/sensing component 199.

At 912, the first network node may update, based on the information, a priority of at least one of the first set of TRPs or the at least one second network node for which PRSs are to be measured by the target UE. For example, referring to FIG. 7A, in an aspect in which an uplink and/or downlink-based positioning or RF sensing session is being performed, the LMF 706 or the SnMF 710, at 720, may update, based on the information, a priority of the first set of TRP(s) 702 for which PRSs are to be measured by the target UE 704E. In an aspect in which sidelink-based positioning or RF sensing session is being performed, the coordinator UE 704A, at 720, may update, based on the information, a priority of the first set of anchor node(s) 704B for which PRSs are to be measured by the target UE 704E. In an aspect, 912 may be performed by the map-aided positioning/sensing component 198 or the map-aided positioning/sensing component 199.

At 914, the first network node may configure at least one of the first set of TRPs or the at least one second network node for at least one of the positioning session or the RF sensing session. For example, referring to FIG. 7A, in an aspect in which an uplink and/or downlink-based positioning or RF sensing session is being performed, the LMF 706 or the SnMF 710, at 722, may configure at least one of the first set of the TRP(s) 702 for at least one of the positioning session or the RF sensing session. In an aspect in which a sidelink-based positioning or RF sensing session is being performed, the coordinator UE 704A, at 722, may configure at least one of the first set of the anchor node(s) 704B for at least one of the positioning session or the RF sensing session. In an aspect, 914 may be performed by the map-aided positioning/sensing component 198 or the map-aided positioning/sensing component 199.

In some aspects, an ID for each TRP in the first set of TRPs is associated with an ID for each PRS in a first set of PRSs. For example, referring to FIG. 7A, an ID for each TRP of the TRP(s) 702 is associated with an ID for each PRS in a first set of PRSs (e.g., transmitted by each TRP of the TRP(s) 702 at 726).

In some aspects, the PRS may include at least one of a UE-TRAN PRS or a sidelink PRS. For example, referring to FIG. 7A, in an aspect in which an uplink and/or downlink-based positioning or RF sensing session is being performed, the PRSs transmitted by the TRP(s) 702 at 726 may include UE-TRAN PRS. In an aspect in which a sidelink-based positioning or RF sensing session is being performed, the PRSs transmitted by the anchor node(s) 704B may be sidelink PRSs.

In some aspects, as part of 914, at 916, the first network node may configure at least one of the first set of TRPs or the at least one second network node for at least one of the positioning session or the RF sensing session by transmitting, to at least one of the first set of TRPs or the at least one second network node, an indication of the configuration of at least one of the first set of TRPs or the at least one second network node for at least one of the positioning session or the RF sensing session. For example, referring to FIG. 7A, in an aspect in which an uplink and/or downlink-based positioning or RF sensing session is being performed, the LMF 706 or the SnMF 710, at 722, may transmit an indication of the configuration to at least one of the first set of the TRP(s) 702 for at least one of the positioning session or the RF sensing session. In an aspect in which a sidelink-based positioning or RF sensing session is being performed, the coordinator UE 704A, at 722, may transmit an indication of the configuration to at least one of the first set of the anchor node(s) 704B for at least one of the positioning session or the RF sensing session. In an aspect, 916 may be performed by the map-aided positioning/sensing component 198 or the map-aided positioning/sensing component 199.

In some aspects, as part of 914, at 918, the first network node may transmit, for at least one of the first set of TRPs or the at least one second network node based on the information, an indication that indicates PRS transmissions are to be disabled. For example, referring to FIG. 7A, in an aspect in which an uplink and/or downlink-based positioning or RF sensing session is being performed, the LMF 706 or the SnMF 710, at 722, may transmit, for at least one of the first set of TRP(s) 702 based on the information, an indication that indicates PRS transmissions are to be disabled. The indication may be transmitted as part of the indication of the configuration transmitted at 722. In an aspect in which a sidelink-based positioning or RF sensing session is being performed, the coordinator UE 704A, at 722, may transmit, for the anchor node(s) 704B based on the information, an indication that indicates PRS transmissions are to be disabled. The indication may be transmitted as part of the indication of the configuration transmitted at 722. In an aspect, 918 may be performed by the map-aided positioning/sensing component 198 or the map-aided positioning/sensing component 199.

At 920, the first network node may receive an indication that a target UE, for which at least one of the positioning session or the RF sensing session is performed, is dropping PRS measurements for a particular unit of time, where the indication is based on second map information associated with the target UE. For example, referring to FIG. 7B, in an aspect in which an uplink and/or downlink-based positioning or RF sensing session is being performed, the LMF 706 or the SnMF 710, at 730, may receive an indication that the target UE 704E is dropping PRS measurements for a particular unit of time, where the indication is based on map information associated with the target UE 704E and obtained at 717. In an aspect in which a sidelink-based positioning or RF sensing session is being performed, the coordinator UE 704A may receive an indication that the target UE 704E is dropping PRS measurements for a particular unit of time, where the indication is based on map information associated with the target UE 704E and obtained at 717. In an aspect, 920 may be performed by the map-aided positioning/sensing component 198 or the map-aided positioning/sensing component 199.

In some aspects, the particular unit of time may include at least one of a number of slots, a number of subframes, a number of milliseconds, or a number of seconds. For example, referring to FIG. 7B, the particular unit of time that may be indicated via the indication received at 730 may include at least one of a number of slots, a number of subframes, a number of milliseconds, or a number of seconds.

At 922, the first network node may receive, from a target UE, an indication that indicates (e.g., recommends or suggests) dropping PRS resources for at least one of one or more TRPs of the first set of TRPs or the at least one second network node. For example, referring to FIG. 7B, in an aspect in which an uplink and/or downlink-based positioning or RF sensing session is being performed, the LMF 706 or the SnMF 710, at 730, may receive, from the target UE 704E, an indication that indicates (e.g., recommends or suggests) dropping PRS resources for at least one of the TRP(s) 702. In an aspect in which a sidelink-based positioning or RF sensing session is being performed, the coordinator UE 704A, at 730, may receive, from the target UE 704E, an indication that indicates (e.g., recommends or suggests) dropping PRS resources for at least one of the anchor node(s) 704B. In an aspect, 922 may be performed by the map-aided positioning/sensing component 198 or the map-aided positioning/sensing component 199.

In some aspects, as part of 922, at 924, the first network node may receive the indication via one of LPP signaling or SLPP signaling. For example, referring to FIG. 7B, in an aspect in which an uplink and/or downlink-based positioning or RF sensing session is being performed, the LMF 706 or the SnMF 710 may, at 730, receive the indication via LPP signaling. In an aspect in which a sidelink-based positioning or RF sensing session is being performed, the coordinator UE 704A may, at 730, receive the indication via SLPP signaling. In an aspect, 924 may be performed by the map-aided positioning/sensing component 198 or the map-aided positioning/sensing component 199.

At 926, the first network node may transmit, for at least one of the one or more TRPs of the first set of TRPs or the at least one second network node, an indication to drop the PRS resources. For example, referring to FIG. 7B, in an aspect in which an uplink and/or downlink-based positioning or RF sensing session is being performed, the LMF 706 or the SnMF 710, at 732, transmit, for the at least one of the TRP(s) 702, an indication to drop the PRS resources. In an aspect in which a sidelink-based positioning or RF sensing session is being performed, the coordinator UE 704A, at 732, may transmit, for the at least one of the anchor node(s) 704B, an indication to drop the PRS resources. In an aspect, 926 may be performed by the map-aided positioning/sensing component 198 or the map-aided positioning/sensing component 199.

At 928, the first network node may determine a second location of the target UE. For example, referring to FIG. 7B, in an aspect in which an uplink and/or downlink-based positioning or RF sensing session is being performed, the LMF 706 or the SnMF 710 may, at 734, determine an updated location of the target UE 704E. In an aspect in which sidelink-based positioning or RF sensing session is being performed, the coordinator UE 704A, at 734, may determine an updated location of the target UE 704E. In an aspect, 928 may be performed by the map-aided positioning/sensing component 198 or the map-aided positioning/sensing component 199.

At 930, the first network node may select, based on the second location and the map information, at least one of a second set of TRPs or the at least one third network node for at least one of the positioning session or the RF sensing session. For example, referring to FIG. 7B, in an aspect in which an uplink and/or downlink-based positioning or RF sensing session is being performed, the LMF 706 or the SnMF 710 may, at 736, may select, based on the second location and the map information, a second set of the TRP(s) 702. In an aspect in which sidelink-based positioning or RF sensing session is being performed, the coordinator UE 704A, at 736, may select, based on the second location and the map information, at least other node from the anchor node(s) 704B. In an aspect, 930 may be performed by the map-aided positioning/sensing component 198 or the map-aided positioning/sensing component 199.

At 932, the first network node may configure at least one of the second set of TRPs or the at least one third network node for at least one of the positioning session or the RF sensing session. For example, referring to FIG. 7B, in an aspect in which an uplink and/or downlink-based positioning or RF sensing session is being performed, the LMF 706 or the SnMF 710, at 738, may configure at least one of the TRP(s) 702. In an aspect in which a sidelink-based positioning or RF sensing session is being configured, the coordinator UE 704A, at 738, may configure a node of the anchor node(s) 704B. In an aspect, 932 may be performed by the map-aided positioning/sensing component 198 or the map-aided positioning/sensing component 199.

Figure 10:
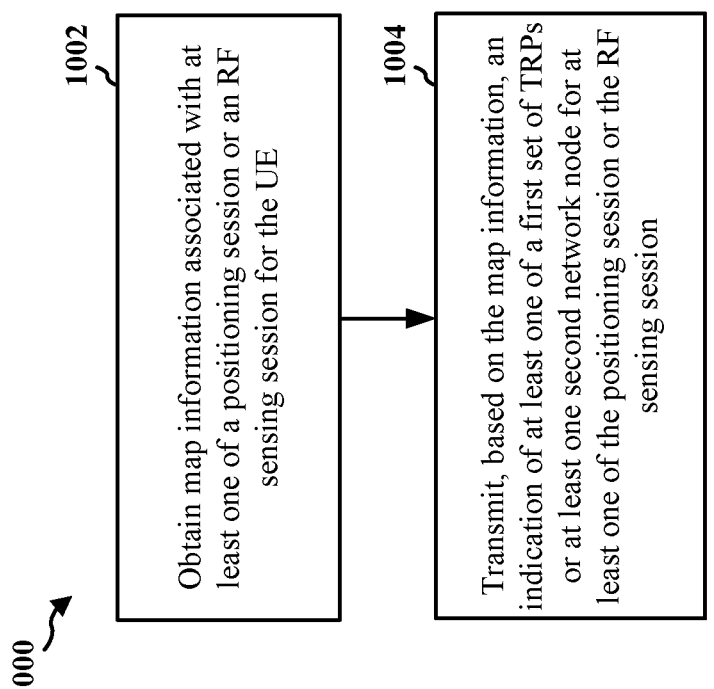
FIG. 10 is a diagram illustrating an example of a hardware implementation for an example apparatus and/or network entity.

FIG. 10 is a flowchart 1000 illustrating methods of wireless communication at a UE in accordance with various aspects of the present disclosure. In some aspects, the UE may be the UE 104, the UE 350, the UE 404, the target UEs 504 and the target UE 604D, or the target UE 704E, or the apparatus 1204 in the hardware implementation of FIG. 12.

At 1002, the UE may obtain map information associated with at least one of a positioning session or an RF sensing session for the UE. For example, referring to FIG. 7A, the target UE 704E, at 717, may obtain map information associated with at least one of a positioning session or an RF sensing session for the target UE 704E. In an aspect, 1002 may be performed by the map-aided positioning/sensing component 198.

At 1004, the UE may transmit, based on the map information, an indication of at least one of a first set of TRPs or at least one network node for at least one of the positioning session or the RF sensing session. For example, referring to FIG. 7A, in an aspect in which an uplink and/or downlink-based positioning or RF sensing session is being performed for the target UE 704E, the target UE 704E may transmit, at 718 or 730, an indication of the first set of the TRP(s) 702. For example, the target UE 704E may provide a list of suitable or desired TRPs of the TRP(s) 702. In an aspect in which sidelink-based positioning or RF sensing session is being performed for the target UE 704E, the target UE may transmit, at 718 or 730, an indication of the anchor node(s) 704B. For example, the target UE 704E may provide a list of suitable or desired anchor nodes of the anchor node(s) 704B. In an aspect, 1004 may be performed by the map-aided positioning/sensing component 198.

In some aspects, the indication may indicate that the UE is dropping PRS measurements for at least one of the first set of TRPs or the at least one network node for a particular unit of time. For example, referring to FIG. 7B, in an aspect in which an uplink and/or downlink-based positioning or RF sensing session is being performed, at 730, the target UE 704E may transmit an indication that the target UE 704E is dropping PRS measurements for at least one of the first of the TRP(s) 702. In an aspect in which a sidelink-based positioning or RF sensing session is being performed, at 730, the target UE 704E may transmit an indication that the target UE 704E is dropping PRS measurements for at least one of the anchor node(s) 704B.

In some aspects, the UE may drop PRS measurements for at least one of the first set of TRPs or the at least one network node for the particular unit of time. For example, referring to FIG. 7B, in an aspect in which an uplink and/or downlink-based positioning or RF sensing session is being performed, the target UE 704E may drop PRS measurements for PRS reference signals received from at least one of the first set of the TRP(s) 702 received at 726. In an aspect in which sidelink-based positioning or RF sensing session is being performed, the target UE 704E may drop PRS measurements for PRS reference signals received from at least one anchor node of the anchor node(s) 704B received at 726.

In some aspects, the particular unit of time includes at least one of a number of slots, a number of subframes, a number of milliseconds, or a number of seconds. For example, referring to FIG. 7B, the particular unit of time indicated at 730 may include at least one of a number of slots, a number of subframes, a number of milliseconds, or a number of seconds.

In some aspects, the indication may indicate dropping PRS resources for at least one of the first set of TRPs or the at least one network node. For example, referring to FIG. 7B, in an aspect in which an uplink and/or downlink-based positioning or RF sensing session is being performed, at 730, the target UE 704E may transmit an indication that indicates (e.g., recommends or suggests) dropping PRS resources for the first set of the TRP(s) 702. In an aspect in which a sidelink-based positioning or RF sensing session is being performed, at 730, the target UE 704E may transmit an indication that indicates (e.g., recommends or suggests) dropping PRS resources for at least one anchor node of the anchor node(s) 704B.

In some aspects, the indication indicates that PRS transmissions for at least one of the first set of TRPs or the at least one network node are to be disabled. For example, referring to FIG. 7B, in an aspect in which an uplink and/or downlink-based positioning or RF sensing session is being performed, the indication transmitted at 730 may indicate that the first of TRP(s) 702 are to be disabled. In an aspect in which a sidelink-based positioning or RF sensing session is being performed, the indication transmitted at 730 may indicate that at least one anchor node of the anchor node(s) 704B are to be disabled.

In some aspects, the UE may transmit the indication via one of LPP signaling or SLPP signaling. For example, referring to FIG. 7B, in an aspect in which an uplink and/or downlink-based positioning or RF sensing session is being performed, the target UE 704E may transmit the indication at 718 or 730 via LPP signaling. In an aspect in which a sidelink-based positioning or RF sensing session is being performed, the target UE 704E may transmit the indication at 718 or 730 via SLPP signaling.

FIG. 11 is a flowchart 1100 illustrating methods of wireless communication at a UE in accordance with various aspects of the present disclosure. In some aspects, the UE may be the UE 104, the UE 350, the UE 404, the target UEs 504 and the target UE 604D, or the target UE 704E, or the apparatus 1204 in the hardware implementation of FIG. 12.

At 1102, the UE may obtain map information associated with at least one of a positioning session or an RF sensing session for the UE. For example, referring to FIG. 7A, the target UE 704E, at 717, may obtain map information associated with at least one of a positioning session or an RF sensing session for the target UE 704E. In an aspect, 1102 may be performed by the map-aided positioning/sensing component 198.

At 1104, the UE may transmit, based on the map information, an indication of at least one of a first set of TRPs or at least one network node for at least one of the positioning session or the RF sensing session. For example, referring to FIG. 7A, in an aspect in which an uplink and/or downlink-based positioning or RF sensing session is being performed for the target UE 704E, the target UE 704E may transmit, at 718 or 730, an indication of the first set of the TRP(s) 702. For example, the target UE 704E may provide a list of suitable or desired TRPs of the TRP(s) 702. In an aspect in which sidelink-based positioning or RF sensing session is being performed for the target UE 704E, the target UE may transmit, at 718 or 730, an indication of the anchor node(s) 704B. For example, the target UE 704E may provide a list of suitable or desired anchor nodes of the anchor node(s) 704B. In an aspect, 1104 may be performed by the map-aided positioning/sensing component 198.

In some aspects, as part of 1104, at 1106, the UE may transmit the indication via one of LPP signaling or SLPP signaling. For example, referring to FIG. 7B, in an aspect in which an uplink and/or downlink-based positioning or RF sensing session is being performed, the target UE 704E may transmit the indication at 718 or 730 via LPP signaling. In an aspect in which a sidelink-based positioning or RF sensing session is being performed, the target UE 704E may transmit the indication at 718 or 730 via SLPP signaling. In an aspect, 1106 may be performed by the map-aided positioning/sensing component 198.

At 1108, the UE may drop PRS measurements for at least one of the first set of TRPs or the at least one network node for a particular unit of time. For example, referring to FIG. 7B, in an aspect in which an uplink and/or downlink-based positioning or RF sensing session is being performed, the target UE 704E may drop PRS measurements for PRS reference signals received from at least one of the first set of the TRP(s) 702 received at 726. In an aspect in which sidelink-based positioning or RF sensing session is being performed, the target UE 704E may drop PRS measurements for PRS reference signals received from at least one anchor node of the anchor node(s) 704B received at 726. In an aspect, 1108 may be performed by the map-aided positioning/sensing component 198.

In some aspects, the indication may indicate that the UE is dropping PRS measurements for at least one of the first set of TRPs or the at least one network node for the particular unit of time. For example, referring to FIG. 7B, in an aspect in which an uplink and/or downlink-based positioning or RF sensing session is being performed, at 730, the target UE 704E may transmit an indication that the target UE 704E is dropping PRS measurements for at least one of the first of the TRP(s) 702. In an aspect in which a sidelink-based positioning or RF sensing session is being performed, at 730, the target UE 704E may transmit an indication that the target UE 704E is dropping PRS measurements for at least one of the anchor node(s) 704B.

In some aspects, the particular unit of time includes at least one of a number of slots, a number of subframes, a number of milliseconds, or a number of seconds. For example, referring to FIG. 7B, the particular unit of time indicated at 730 may include at least one of a number of slots, a number of subframes, a number of milliseconds, or a number of seconds.

In some aspects, the indication may indicate dropping PRS resources for at least one of the first set of TRPs or the at least one network node. For example, referring to FIG. 7B, in an aspect in which an uplink and/or downlink-based positioning or RF sensing session is being performed, at 730, the target UE 704E may transmit an indication that indicates (e.g., recommends or suggests) dropping PRS resources for the first set of the TRP(s) 702. In an aspect in which a sidelink-based positioning or RF sensing session is being performed, at 730, the target UE 704E may transmit an indication that indicates (e.g., recommends or suggests) dropping PRS resources for at least one anchor node of the anchor node(s) 704B.

In some aspects, the indication indicates that PRS transmissions for at least one of the first set of TRPs or the at least one network node are to be disabled. For example, referring to FIG. 7B, in an aspect in which an uplink and/or downlink-based positioning or RF sensing session is being performed, the indication transmitted at 730 may indicate that the first of TRP(s) 702 are to be disabled. In an aspect in which a sidelink-based positioning or RF sensing session is being performed, the indication transmitted at 730 may indicate that at least one anchor node of the anchor node(s) 704B are to be disabled.

Figure 12:
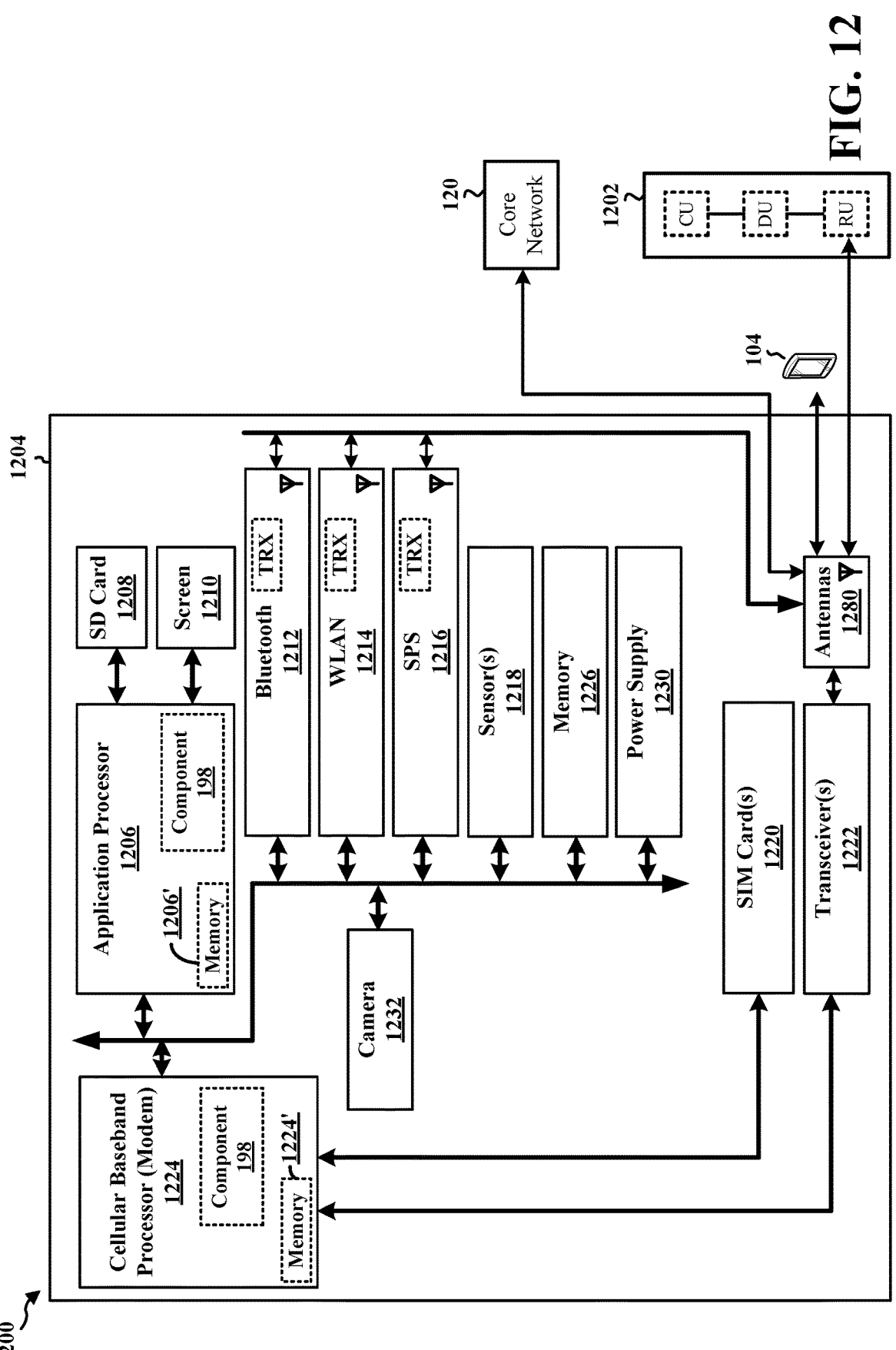
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104, the core network 120, and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 may be configured to obtain first map information associated with at least one of a positioning session or an RF sensing session, to select, based on the first map information, at least one of a first set of TRPs or at least one second network node for at least one of the positioning session or the RF sensing session, and to configure at least one of the first set of TRPs or the at least one second network node for at least one of the positioning session or the RF sensing session. In some aspects, the component 198 may be configured to obtain map information associated with at least one of a positioning session or an RF sensing session for the UE, and to transmit, based on the map information, an indication of at least one of a first set of TRPs or at least one network node for at least one of the positioning session or the RF sensing session. The component 198 may be configured to perform any of the aspects described in connection with the flowchart in FIGS. 8-11 and/or the aspects performed by the coordinator UE 704A or the target UE 704E in the communication flow in FIGS. 7A-7B. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for obtaining first map information associated with at least one of a positioning session or an RF sensing session, means for selecting, based on the first map information, at least one of a first set of TRPs or at least one second network node for at least one of the positioning session or the RF sensing session, and means for configuring at least one of the first set of TRPs or the at least one second network node for at least one of the positioning session or the RF sensing session. In another configuration, the apparatus 1204, and in particular the cellular baseband processor 1224 and/or the application processor 1206, may include means for obtaining map information associated with at least one of a positioning session or an RF sensing session for the UE, and transmitting, based on the map information, an indication of at least one of a first set of TRPs or at least one network node for at least one of the positioning session or the RF sensing session. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
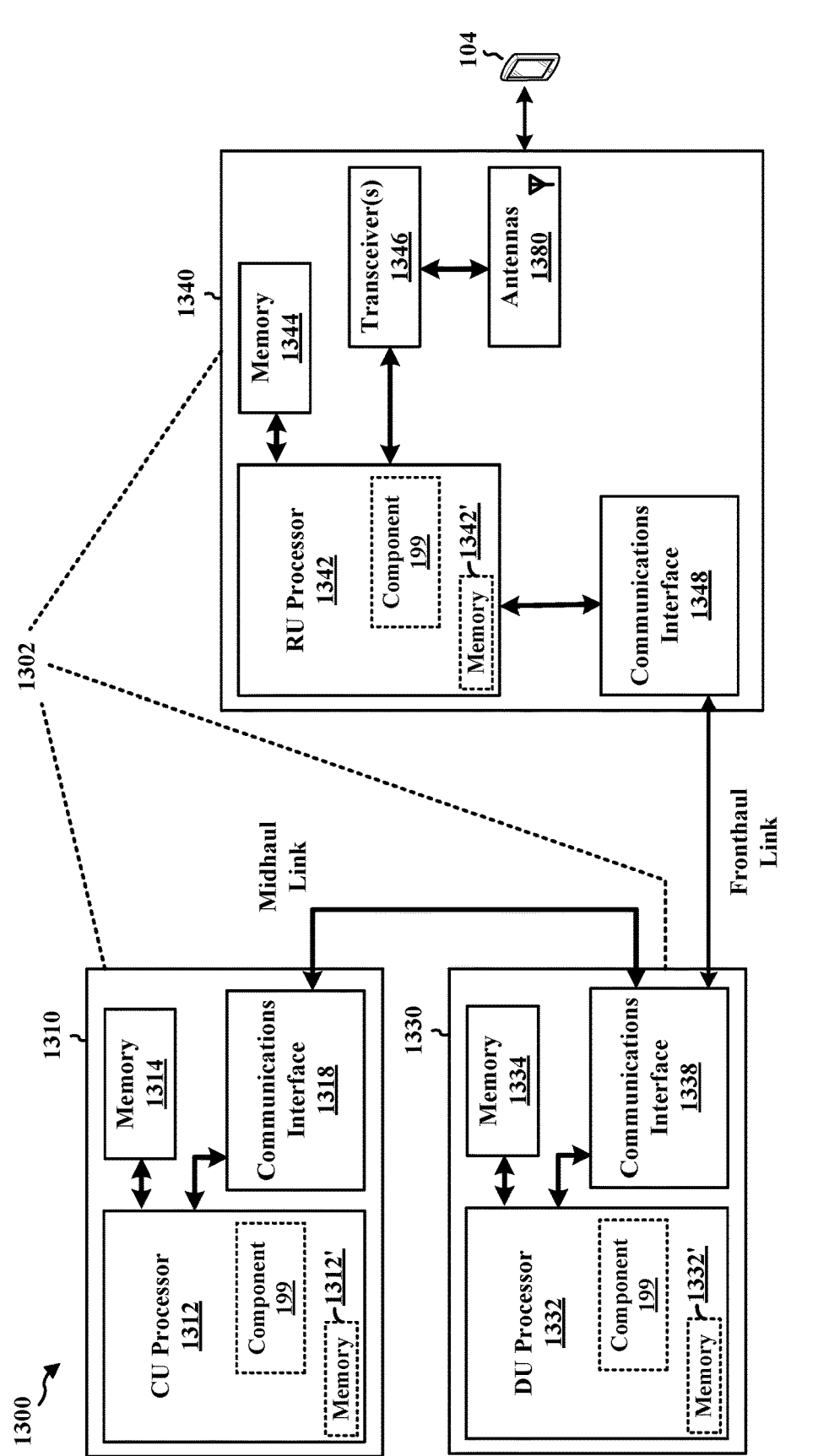
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

Figure 14:
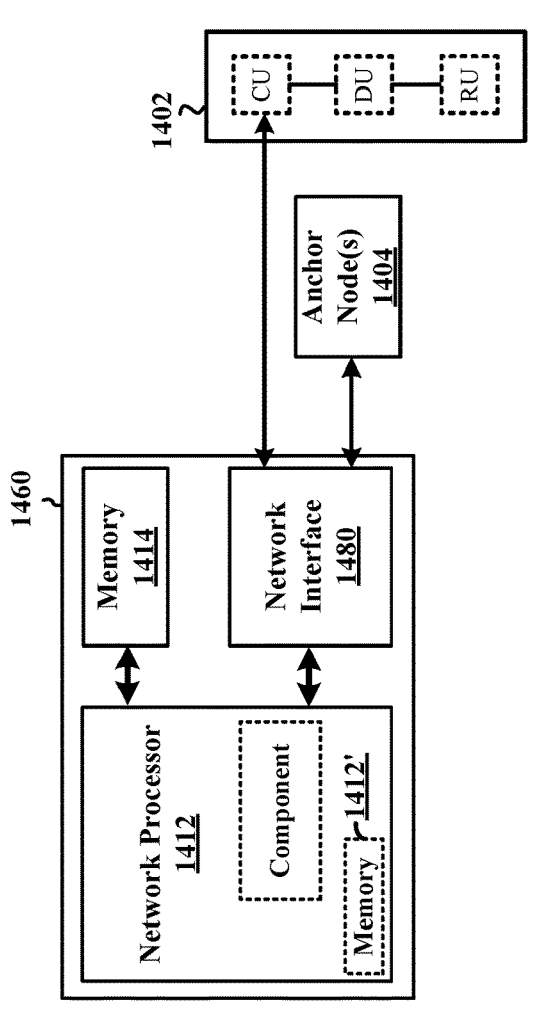
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402 and the anchor node 1404, which is an example of the anchor node(s) 704B. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to obtain first map information associated with at least one of a positioning session or an RF sensing session, to select, based on the first map information, at least one of a first set of TRPs or at least one second network node for at least one of the positioning session or the RF sensing session, and to configure at least one of the first set of TRPs or the at least one second network node for at least one of the positioning session or the RF sensing session. The component 199 may be configured to perform any of the aspects described in connection with the flowchart in FIGS. 8-9 and/or the aspects performed by the coordinator UE 704A or the target UE 704E in the communication flow in FIGS. 7A-7B. The component 199 may be within the processor 1412. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for obtaining first map information associated with at least one of a positioning session or an RF sensing session, means for selecting, based on the first map information, at least one of a first set of TRPs or at least one second network node for at least one of the positioning session or the RF sensing session, and means for configuring at least one of the first set of TRPs or the at least one second network node for at least one of the positioning session or the RF sensing session. The means may be the component 199 of the network entity 1460 configured to perform the functions recited by the means.

Various aspects relate generally to positioning systems. Some aspects more specifically relate to positioning or RF sensing utilizing map information. In some examples, a coordinator node may obtain map information regarding an environment in which a target entity for which a positioning or sensing session is to be performed. Based on at least the map information, the coordinator node may select and/or configure a set of transmission-reception points (TRPs) or anchor nodes to be utilized or not utilized for the positioning or sensing session. For example, the coordinator node may activate or deactivate the transmission or reception of reference signals (e.g., positioning reference signals (PRSs)) from the set of TRPs or anchor nodes based on the configuration. The coordinator node may select and/or configure the set of TRPs for uplink or downlink-based positioning or sensing and may select and/or configure the anchor nodes for sidelink-based positioning or sensing. In some aspects, the target UE may, based on its map information, provide an indication of a set of TRPs or anchor nodes to be utilized for its positioning or sensing session.

Particular aspects of the subject matter described in this disclosure can be implemented to realize one or more of the following potential advantages. By utilizing map information associated with the particular environment in which the target entity is located, the coordinator node may determine TRPs or anchor nodes that do not have a direct line of sight to the target entity due to obstacles in the environment that are indicated by the map information. The coordinator node may disable reference signal transmission or reception from such TRPs or anchor nodes. By disabling reference signal transmission or reception from such TRPs or anchor nodes, such TRPs or anchor nodes (as well as the target entity configured to detect such reference signals) may conserve compute resources (e.g., processing cycles, memory, power, etc.). The coordinator node may also enable reference signal transmission or reception from TRPs or anchor nodes that have a direct line of sight to the target entity. By enabling reference signal transmission or reception from such TRPs or anchor nodes, the position of the target entity may be more accurately determined.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network node, including obtaining first map information associated with at least one of a positioning session or an RF sensing session; selecting, based on the first map information, at least one of a first set of TRPs or at least one second network node for at least one of the positioning session or the RF sensing session; and configuring at least one of the first set of TRPs or the at least one second network node for at least one of the positioning session or the RF sensing session.

Aspect 2 is the method of aspect 1, where configuring at least one of the first set of TRPs or the at least one second network node for at least one of the positioning session or the RF sensing session includes: transmitting, to at least one of the first set of TRPs or the at least one second network node, an indication of the configuration of at least one of the first set of TRPs or the at least one second network node for at least one of the positioning session or the RF sensing session.

Aspect 3 is the method of any of aspects 1 and 2, where the first network node is a first user equipment (UE) that is configured to coordinate at least one of the positioning session or the RF sensing session for the at least one second network node, and where the at least one second network node is a second UE.

Aspect 4 is the method of any of aspects 1 and 2, where the first network node is at least one of an LMF or an SnMF.

Aspect 5 is the method of any of aspects 1 to 4, further including: receiving, from a target UE, information indicative of at least one of the first set of TRPs or the at least one second network node, where the information is based on second map information associated with the target UE, and where the at least one of the positioning session or the RF sensing session is performed for the target UE.

Aspect 6 is the method of any of aspects 1 to 5, further including: updating, based on the information, a priority of at least one of the first set of TRPs or the at least one second network node for which PRSs are to be measured by the target UE.

Aspect 7 is the method of aspect 6, further including: transmitting, for at least one of the first set of TRPs or the at least one second network node based on the information, an indication that indicates PRS transmissions are to be disabled.

Aspect 8 is the method of any of aspects 1 to 7, further including: receiving an indication that a target UE, for which at least one of the positioning session or the RF sensing session is performed, is dropping PRS measurements for a particular unit of time, where the indication is based on second map information associated with the target UE.

Aspect 9 is the method of aspect 8, where the particular unit of time includes at least one of a number of slots; a number of subframes; a number of milliseconds; or a number of seconds.

Aspect 10 is the method of any of aspects 1 to 9, further including: receiving, from a target UE, an indication that indicates dropping PRS resources for at least one of one or more TRPs of the first set of TRPs or the at least one second network node; and transmitting, for at least one of the one or more TRPs of the first set of TRPs or the at least one second network node, an indication to drop the PRS resources.

Aspect 11 is the method of aspect 10, where receiving the indication includes: receiving the indication via one of LPP signaling or SLPP signaling.

Aspect 12 is the method of any of aspects 1 to 11, where an ID for each TRP in the first set of TRPs is associated with an ID for each PRS in a first set of PRSs.

Aspect 13 is the method of aspect 12, where the PRS includes at least one of: a UE-TRAN PRS; or a SL PRS.

Aspect 14 is the method of any of aspects 1 to 13, further including: determining a first location of a target UE for which at least one of the positioning session or the RF sensing session is performed, where selecting at least one of the first set of TRPs or the at least one second network node includes: selecting at least one of the first set of TRPs or the at least one second network node based on the first location and the map information.

Aspect 15 is the method of aspect 14, further including: determining a second location of the target UE; selecting, based on the second location and the map information, at least one of a second set of TRPs or at least one third network node for at least one of the positioning session or the RF sensing session; and configuring at least one of the second set of TRPs or the at least one third network node for at least one of the positioning session or the RF sensing session.

Aspect 16 is a method of wireless communication at a UE, including: obtaining map information associated with at least one of a positioning session or an RF sensing session for the UE; and transmitting, based on the map information, an indication of at least one of a first set of TRPs or at least one network node for at least one of the positioning session or the RF sensing session.

Aspect 17 is the method of aspect 16, further including: dropping PRS measurements for at least one of the first set of TRPs or the at least one network node for a particular unit of time.

Aspect 18 is the method of aspect 17, where the indication indicates that the UE is dropping the PRS measurements for at least one of the first set of TRPs or the at least one network node for the particular unit of time.

Aspect 19 is the method of any of aspects 17 and 18, where the particular unit of time includes at least one of: a number of slots; a number of subframes; a number of milliseconds; or a number of seconds.

Aspect 20 is the method of any of aspects 16 to 19, where the indication indicates dropping PRS resources for at least one of the first set of TRPs or the at least one network node.

Aspect 21 is the method of any of aspects 16 to 20, where transmitting the indication includes: transmitting the indication via one of LP) signaling or SLPP signaling.

Aspect 22 is the method of aspects 16 to 21, where the indication indicates that PRS transmissions for at least one of the first set of TRPs or the at least one network node are to be disabled.

Aspect 23 is an apparatus for wireless communication at a first network node. The apparatus includes memory; and at least one processor coupled to the memory and, based at least in part on information stored in the memory, the at least one processor is configured to implement any of aspects 1 to 15.

Aspect 24 is the apparatus of aspect 23, further including at least one of a transceiver or an antenna coupled to the at least one processor.

Aspect 25 is an apparatus for wireless communication at a first network node. The apparatus includes memory; and at least one processor coupled to the memory and, based at least in part on information stored in the memory, the at least one processor is configured to implement any of aspects 16 to 22.

Aspect 26 is the apparatus of aspect 25, further including at least one of a transceiver or an antenna coupled to the at least one processor.

Aspect 27 is an apparatus for wireless communication including means for implementing any of aspects 1 to 15.

Aspect 28 is an apparatus for wireless communication including means for implementing any of aspects 16 to 22.

Aspect 29 is a computer-readable medium (e.g., a non-transitory computer-readable medium) storing computer executable code, where the code when executed by a processor causes the processor to implement any of aspects 1 to 15.

Aspect 30 is a computer-readable medium (e.g., a non-transitory computer-readable medium) storing computer executable code, where the code when executed by a processor causes the processor to implement any of aspects 16 to 22.

What is claimed is:

1. An apparatus for wireless communication at a first network node, comprising:

memory; and at least one processor coupled to the memory and, based at least in part on information stored in the memory, the at least one processor is configured to:

obtain first map information associated with at least one of a positioning session or a radio frequency (RF) sensing session;

select, based on the first map information, at least one of a first set of transmission-reception points (TRPs) or at least one second network node for at least one of the positioning session or the RF sensing session;

receive, from a target UE, information indicative of at least one of the first set of TRPs or the at least one second network node, wherein the information is based on second map information associated with the target UE, and wherein the at least one of the positioning session or the RF sensing session is for the target UE; and configure at least one of the first set of TRPs or the at least one second network node for at least one of the positioning session or the RF sensing session.

2. The apparatus of claim 1, wherein, to configure at least one of the first set of TRPs or the at least one second network node for at least one of the positioning session or the RF sensing session, the at least one processor is configured to:

transmit, to at least one of the first set of TRPs or the at least one second network node, an indication of the configuration of at least one of the first set of TRPs or the at least one second network node for at least one of the positioning session or the RF sensing session.

3. The apparatus of claim 1, wherein the first network node is a first user equipment (UE) that is configured to coordinate at least one of the positioning session or the RF sensing session for the at least one second network node, and wherein the at least one second network node is a second UE.

4. The apparatus of claim 1, wherein the first network node is at least one of a location management function (LMF) or a sensing management function (SnMF).

5. The apparatus of claim 1, wherein the at least one processor is further configured to:

update, based on the information, a priority of at least one of the first set of TRPs or the at least one second network node for which positioning reference signals (PRSs) are to be measured by the target UE.

6. The apparatus of claim 1, wherein the at least one processor is further configured to:

transmit, for at least one of the first set of TRPs or the at least one second network node based on the information, an indication that indicates PRS transmissions are to be disabled.

7. The apparatus of claim 1, wherein the at least one processor is further configured to:

receive an indication that the target UE is configured to drop PRS measurements for a particular unit of time, wherein the indication is based on the second map information associated with the target UE.

8. The apparatus of claim 7, wherein the particular unit of time comprises at least one of:

a number of slots;

a number of subframes;

a number of milliseconds; or a number of seconds.

9. The apparatus of claim 1, further comprising at least one of a transceiver or an antenna coupled to the at least one processor, wherein the at least one processor is further configured to:

receive, from a target UE via at least one of the transceiver or the antenna, an indication that indicates to drop PRS resources for at least one of one or more TRPs of the first set of TRPs or the at least one second network node; and transmit, for at least one of the one or more TRPs of the first set of TRPs or the at least one second network node via at least one of the transceiver or the antenna, an indication to drop the PRS resources.

10. The apparatus of claim 9, wherein, to receive the indication, the at least one processor is configured to:

receive the indication via one of long-term evolution (LTE) positioning protocol (LPP) signaling or sidelink-based positioning protocol (SLPP) signaling.

11. The apparatus of claim 1, wherein an identifier (ID) for each TRP in the first set of TRPs is associated with an ID for each PRS in a first set of PRSs.

12. The apparatus of claim 11, wherein the PRS comprises at least one of:

a UE-terrestrial radio access network (TRAN) PRS; or a sidelink (SL) PRS.

13. The apparatus of claim 1, wherein the at least one processor is further configured to:

determine a first location of a target UE, wherein the at least one of the positioning session or the RF sensing session is for the target UE, wherein, to select at least one of the first set of TRPs or the at least one second network node, the at least one processor is configured to:

select at least one of the first set of TRPs or the at least one second network node based on the first location and the map information.

14. The apparatus of claim 13, wherein the at least one processor is further configured to:

determine a second location of the target UE;

select, based on the second location and the map information, at least one of a second set of TRPs or at least one third network node for at least one of the positioning session or the RF sensing session; and configure at least one of the second set of TRPs or the at least one third network node for at least one of the positioning session or the RF sensing session.

15. An apparatus for wireless communication at a user equipment UE), comprising:

memory; and at least one processor coupled to the memory and, based at least in part on information stored in the memory, the at least one processor is configured to:

obtain map information associated with at least one of a positioning session or a radio frequency (RF) sensing session for the UE; and transmit, to a network entity based on the map information, an indication of at least one of a first set of transmission-reception points (TRPs) or at least one network node for at least one of the positioning session or the RF sensing session, wherein the map information is different from second map information associated with the positioning session or the RF sensing session at the network entity.

16. The apparatus of claim 15, wherein the at least one processor is further configured to:

drop positioning reference signal (PRS) measurements for at least one of the first set of TRPs or the at least one network node for a particular unit of time.

17. The apparatus of claim 16, wherein the indication indicates that the UE is configured to drop the PRS measurements for at least one of the first set of TRPs or the at least one network node for the particular unit of time.

18. The apparatus of claim 16, wherein the particular unit of time comprises at least one of:

a number of slots;

a number of subframes;

a number of milliseconds; or a number of seconds.

19. The apparatus of claim 15, wherein the indication indicates a drop of PRS resources for at least one of the first set of TRPs or the at least one network node.

20. The apparatus of claim 15, further comprising at least one of a transceiver or an antenna coupled to the at least one processor, wherein, to transmit the indication, the at least one processor is configured to:

transmit, via at least one of the transceiver or the antenna, the indication via one of long-term evolution (LTE) positioning protocol (LPP) signaling or sidelink-based positioning protocol (SLPP) signaling.

21. The apparatus of claim 20, wherein the indication indicates that PRS transmissions for at least one of the first set of TRPs or the at least one network node are to be disabled.

22. A method of wireless communication at a first network node, comprising:

obtaining first map information associated with at least one of a positioning session or a radio frequency (RF) sensing session;

selecting, based on the first map information, at least one of a first set of transmission-reception points (TRPs) or at least one second network node for at least one of the positioning session or the RF sensing session;

receiving, from a target UE, information indicative of at least one of the first set of TRPs or the at least one second network node, wherein the information is based on second map information associated with the target UE, and wherein the at least one of the positioning session or the RF sensing session is for the target UE; and configuring at least one of the first set of TRPs or the at least one second network node for at least one of the positioning session or the RF sensing session.

23. The method of claim 22, wherein configuring at least one of the first set of TRPs or the at least one second network node for at least one of the positioning session or the RF sensing session comprises:

transmitting, to at least one of the first set of TRPs or the at least one second network node, an indication of the configuration of at least one of the first set of TRPs or the at least one second network node for at least one of the positioning session or the RF sensing session.

24. The method of claim 22, wherein the first network node is a first user equipment (UE) that is configured to coordinate at least one of the positioning session or the RF sensing session for the at least one second network node, and wherein the at least one second network node is a second UE.

25. The method of claim 22, wherein the first network node is at least one of a location management function (LMF) or a sensing management function (SnMF).

26. A method of wireless communication at a user equipment (UE), comprising:

obtaining map information associated with at least one of a positioning session or a radio frequency (RF) sensing session for the UE; and transmitting, to a network entity based on the map information, an indication of at least one of a first set of transmission-reception points (TRPs) or at least one network node for at least one of the positioning session or the RF sensing session, wherein the map information is different from second map information associated with the positioning session or the RF sensing session at the network entity.

27. The method of claim 26, further comprising:

dropping positioning reference signal (PRS) measurements for at least one of the first set of TRPs or the at least one network node for a particular unit of time.

28. The method of claim 27, wherein the indication indicates that the UE is dropping the PRS measurements for at least one of the first set of TRPs or the at least one network node for the particular unit of time.

29. The method of claim 27, wherein the particular unit of time comprises at least one of:

a number of slots;

a number of subframes;

a number of milliseconds; or a number of seconds.

* * * * *